(12) United States Patent
Luo et al.

(10) Patent No.: US 10,154,514 B2
(45) Date of Patent: Dec. 11, 2018

(54) SCHEDULING REQUEST TRANSMISSION FOR DIRECTIONAL BEAM ACCESS

(71) Applicant: QUALCOMM Incorporated, San Diego, CA (US)

(72) Inventors: Tao Luo, San Diego, CA (US); Ajay Gupta, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,964

(22) Filed: Sep. 20, 2017

(65) Prior Publication Data

US 2018/0110066 A1    Apr. 19, 2018

Related U.S. Application Data

(60) Provisional application No. 62/409,838, filed on Oct. 18, 2016.

(51) Int. Cl.
*H04W 72/12*    (2009.01)
*H04B 7/08*    (2006.01)
(Continued)

(52) U.S. Cl.
CPC ........ *H04W 72/1284* (2013.01); *H04B 7/088* (2013.01); *H04W 72/0413* (2013.01); *H04W 72/1236* (2013.01); *H04W 72/1268* (2013.01); *H04L 1/1854* (2013.01); *H04W 16/28* (2013.01); *H04W 28/20* (2013.01); *H04W 72/1257* (2013.01)

(58) Field of Classification Search
None
See application file for complete search history.

(56) References Cited

U.S. PATENT DOCUMENTS 7,821,977 B2 * 10/2010 Kim ...................... H04W 52/16
370/311
8,526,966 B2 * 9/2013 Chen .................... H04W 52/286
370/227

(Continued)

OTHER PUBLICATIONS

Ericsson, "On Autonomous UL Transmissions for NR in Unlicensed Spectrum," 3GPP TSG-RAN WG1 Meeting #86bis, R1-1609639, Lisbon, Portugal, Oct. 10-14, 2016, 3 pgs., XP051149675, 3rd Generation Partnership Project.

(Continued)

*Primary Examiner* — Robert C Scheibel
(74) *Attorney, Agent, or Firm* — Holland & Hart LLP

(57) ABSTRACT

A user equipment (UE) may transmit a UE-generated uplink message to a base station to request resources for an uplink transmission. The UE may be configured to send the message (e.g., a scheduling request (SR)) using different transmission modes. For example, the UE may transmit the SR using a scheduled mode where the UE conveys the SR along with another uplink message (e.g., a control message). In some examples, the UE may transmit the SR using an autonomous mode where the UE transmits the SR in resources reserved for SR transmissions. The UE may determine which transmission mode to use based on certain characteristics of the SR or the data associated with the SR.

30 Claims, 19 Drawing Sheets

(51) Int. Cl.
*H04W 72/04* (2009.01)
*H04L 1/18* (2006.01)
*H04W 28/20* (2009.01)
*H04W 16/28* (2009.01)

(56) References Cited

U.S. PATENT DOCUMENTS

| | | | |
|---|---|---|---|
| 9,769,843 B2* | 9/2017 | Chandra | H04W 72/1278 |
| 9,775,168 B2* | 9/2017 | Langereis | H04B 1/40 |
| 2004/0219919 A1* | 11/2004 | Whinnett | H04W 72/1278 |
| | | | 455/442 |
| 2014/0004898 A1* | 1/2014 | Yu | H04W 72/0413 |
| | | | 455/510 |
| 2016/0044619 A1 | 2/2016 | Ryu et al. | |
| 2016/0262182 A1* | 9/2016 | Yang | H04W 72/04 |
| 2016/0344526 A1 | 11/2016 | Fan et al. | |
| 2017/0142749 A1* | 5/2017 | Kim | H04W 72/1289 |
| 2017/0331577 A1* | 11/2017 | Parkvall | H04J 11/0079 |
| 2017/0331670 A1* | 11/2017 | Parkvall | H04J 11/0079 |
| 2017/0366311 A1* | 12/2017 | Iyer | H04L 5/005 |

OTHER PUBLICATIONS

Intel Corporation: "Scheduling Request Design for NR," 3GPP TSG-RAN WG1 Meeting #86bis, R.1-1610191, Lisbon, Portugal, Oct. 10-14, 2016, 5 pgs., XP051150211, 3rd Generation Partnership Project.

Intel Corporation, "UCI Contents and UL Control Channel Formats," 3GPP TSG-RAN WG1 Meeting #86bis, R1-1609536, Lisbon, Portugal, Oct. 10-14, 2016, 6 pgs., XP051159606, 3rd Generation Partnership Project.

ISA/EP, International Search Report and Written Opinion of the International Searching Authority, Int'l Application No. PCT/US2017/052606, dated Jan. 5, 2018, European Patent Office, Rijswijk, NL, 17 pgs.

Nokia et al., "Multi-Beam Common Control Plane Design," 3GPP TSG-RAN WG1 Meeting #86bis, R1-1610247, Lisbon, Portugal, Oct. 10-14, 2016, 5 pgs., XP051150265, 3rd Generation Partnership Project.

* cited by examiner

SR Region 315

Control Region 320

Data Region 325

SCHEDULING REQUEST TRANSMISSION FOR DIRECTIONAL BEAM ACCESS

CROSS REFERENCES

The present Application for Patent claims priority to U.S. Provisional Patent Application No. 62/409,838 by Luo, et al., entitled "Scheduling Request Transmission For Directional Beam Access," filed Oct. 18, 2016, assigned to the assignee hereof.

BACKGROUND

The following relates generally to wireless communication, and more specifically to scheduling request (SR) transmission for directional beam access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple-access communication system may include a number of smart radio heads (RHs) in communication with a number of access node controllers (ANCs), where a set of one or more RHs, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

In some examples, a wireless network may operate in millimeter wave (mmW) spectrum. Using mmW spectrum may result in additional attenuation, which may impact the link budget of the communications. A UE and a base station operating in mmW spectrum may utilize beamforming techniques to increase the strength of wireless signals in particular directions to address the additional attenuation. However, because of the directional nature of beamformed transmissions, a base station may miss or otherwise fail to decode a message (e.g., a SR) sent from a UE unless there is coordination of the directional transmission and reception of signals between the base station and the UE.

SUMMARY

A user equipment (UE) may transmit a UE-generated uplink message to a base station to request resources for an uplink transmission. In some cases, the UE-generated uplink message may include a scheduling request (SR) or a beam failure recovery request (BFRR). The UE may be configured to send an SR using different transmission modes. For example, the UE may transmit the SR using a scheduled mode where the UE conveys the SR along with another uplink message (e.g., a control message). In some examples, the UE may transmit the SR using an autonomous mode where the UE transmits the SR in resources reserved for SR transmissions. The UE may determine which transmission mode to use based on certain characteristics of the SR or the data associated with the SR or a state of the UE.

The UE may be configured to transmit and receive directional beamformed messages for use in millimeter wave (mmW) spectrum. In some examples, the UE may receive a beamformed signal that conveys control information (e.g., a synchronization signal) from a base station. The beamformed signal may indicate resources that are dedicated for SR transmissions. In an autonomous transmission mode, the UE may identify a SR for transmission, associate the dedicated SR resources with an identification of the beamformed signal, and transmit the SR to the base station on the dedicated resources. In some cases, the UE and base station may operate in a spectrum other than the mmW spectrum (e.g., a spectrum with frequencies below six GHz (sub-6 GHz)).

In some examples, the UE may receive an uplink grant on a beamformed signal. The uplink grant may indicate resources for the UE to use to transmit an uplink message (e.g., data message including control information). In a scheduled mode, the UE may identify a SR for transmission and convey the SR to the base station along with the pre-scheduled uplink message.

A method of wireless communication is described. The method may include identifying a UE-generated uplink message for transmission, determining to transmit the UE-generated uplink message using a scheduled mode or an autonomous mode based at least in part on a characteristic associated with the UE-generated uplink message or a state of the UE, and transmitting the UE-generated uplink message using the scheduled mode or the autonomous mode.

An apparatus for wireless communication is described. The apparatus may include means for identifying a UE-generated uplink message for transmission, means for determining to transmit the UE-generated uplink message using a scheduled mode or an autonomous mode based at least in part on a characteristic associated with the UE-generated uplink message or a state of the UE, and means for transmitting the UE-generated uplink message using the scheduled mode or the autonomous mode.

Another apparatus for wireless communication is described. The apparatus may include a processor, memory in electronic communication with the processor, and instructions stored in the memory. The instructions may be operable to cause the processor to identify a UE-generated uplink message for transmission, determine to transmit the UE-generated uplink message using a scheduled mode or an autonomous mode based at least in part on a characteristic associated with the UE-generated uplink message or a state of the UE, and transmit the UE-generated uplink message using the scheduled mode or the autonomous mode.

A non-transitory computer readable medium for wireless communication is described. The non-transitory computer-readable medium may include instructions operable to cause a processor to identify a UE-generated uplink message for transmission, determine to transmit the UE-generated uplink message using a scheduled mode or an autonomous mode based at least in part on a characteristic associated with the UE-generated uplink message or a state of the UE, and transmit the UE-generated uplink message using the scheduled mode or the autonomous mode.

In some examples of the method, apparatus, and non-transitory computer-readable medium described above, the UE-generated uplink message may include an SR or a BFRR.

In some examples of the method, apparatus, and non-transitory computer-readable medium described above, the characteristic includes a number of bits associated with the UE-generated uplink message.

Some examples of the method, apparatus, and non-transitory computer-readable medium described above may further include processes, features, means, or instructions for transmitting the UE-generated uplink message using the scheduled mode if the number of bits fails to satisfy a predetermined threshold.

Some examples of the method, apparatus, and non-transitory computer-readable medium described above may further include processes, features, means, or instructions for transmitting the UE-generated uplink message using the autonomous mode if the number of bits satisfies a predetermined threshold.

In some examples of the method, apparatus, and non-transitory computer-readable medium described above, the characteristic includes an indication of whether the UE-generated uplink message may be a retransmission of the UE-generated uplink message.

Some examples of the method, apparatus, and non-transitory computer-readable medium described above may further include processes, features, means, or instructions for transmitting the UE-generated uplink message using the scheduled mode if the UE-generated uplink message may be a first transmission of the UE-generated uplink message or if the UE-generated uplink message may be a retransmission of the UE-generated uplink message, where a number of retransmission attempts of the retransmission of the UE-generated uplink message fails to satisfy a predetermined threshold.

Some examples of the method, apparatus, and non-transitory computer-readable medium described above may further include processes, features, means, or instructions for transmitting the UE-generated uplink message using the autonomous mode if the UE-generated uplink message may be a retransmission of the UE-generated uplink message, where a number of retransmission attempts of the retransmission of the UE-generated uplink message satisfies a predetermined threshold.

In some examples of the method, apparatus, and non-transitory computer-readable medium described above, the characteristic includes a priority level associated with the UE-generated uplink message.

Some examples of the method, apparatus, and non-transitory computer-readable medium described above may further include processes, features, means, or instructions for transmitting the UE-generated uplink message using the autonomous mode if the autonomous mode permits transmission of the UE-generated uplink message earlier than if the scheduled mode was used.

Some examples of the method, apparatus, and non-transitory computer-readable medium described above may further include processes, features, means, or instructions for transmitting the UE-generated uplink message using the scheduled mode if the scheduled mode permits transmission of the UE-generated uplink message earlier than if the autonomous mode was used.

Some examples of the method, apparatus, and non-transitory computer-readable medium described above may further include processes, features, means, or instructions for receiving a downlink transmission on at least one downlink directional beam. Some examples of the method, apparatus, and non-transitory computer-readable medium described above may further include processes, features, means, or instructions for identifying dedicated resources for UE-generated uplink message transmissions. Some examples of the method, apparatus, and non-transitory computer-readable medium described above may further include processes, features, means, or instructions for associating the dedicated resources with the at least one downlink directional beam. Some examples of the method, apparatus, and non-transitory computer-readable medium described above may further include processes, features, means, or instructions for transmitting the UE-generated uplink message on the dedicated resources using the autonomous mode.

In some examples of the method, apparatus, and non-transitory computer-readable medium described above, the dedicated resources may be different from resources reserved for random access channel (RACH) transmissions.

In some examples of the method, apparatus, and non-transitory computer-readable medium described above, the UE-generated uplink message transmissions and RACH transmissions may be multiplexed in frequency domain, time domain, code domain, or a combination thereof.

In some examples of the method, apparatus, and non-transitory computer-readable medium described above, the dedicated resources may be resources reserved for RACH transmissions, and where transmitting the UE-generated uplink message includes transmitting a RACH sequence to indicate the UE-generated uplink message.

In some examples of the method, apparatus, and non-transitory computer-readable medium described above, the downlink transmission includes a synchronization signal, a master information block (MIB), or a system information block (SIB).

Some examples of the method, apparatus, and non-transitory computer-readable medium described above may further include processes, features, means, or instructions for receiving a grant indicating resources for an uplink transmission. Some examples of the method, apparatus, and non-transitory computer-readable medium described above may further include processes, features, means, or instructions for associating the UE-generated uplink message with the uplink transmission. Some examples of the method, apparatus, and non-transitory computer-readable medium described above may further include processes, features, means, or instructions for transmitting the UE-generated uplink message on the resources using the scheduled mode.

In some examples of the method, apparatus, and non-transitory computer-readable medium described above, the uplink transmission includes a hybrid automatic repeat request (HARQ) acknowledgment, a channel state feedback (CSF) report, a beam measurement report, a sounding reference signal (SRS), an uplink measurement reference signal, a physical uplink control channel (PUCCH), or a combination thereof.

In some examples of the method, apparatus, and non-transitory computer-readable medium described above, the uplink transmission includes a SRS, and where transmitting the UE-generated uplink message on the resources using the scheduled mode includes indicating a sequence associated with the SRS, a cyclic shift associated with the SRS, or both, that may be indicative of the UE-generated uplink message.

Some examples of the method, apparatus, and non-transitory computer-readable medium described above may further include processes, features, means, or instructions for identifying a second UE-generated uplink message for transmission. Some examples of the method, apparatus, and non-transitory computer-readable medium described above may further include processes, features, means, or instructions for switching from the scheduled mode to the autonomous mode or from the autonomous mode to the scheduled mode. Some examples of the method, apparatus, and non-transitory computer-readable medium described above may further include processes, features, means, or instructions for transmitting the second UE-generated uplink message using the scheduled mode or the autonomous mode.

A method of wireless communication is described. The method may include receiving an uplink grant on one of a plurality of beamformed transmissions in mmW communications system, identifying a UE-generated uplink message for transmission, and transmitting, in the mmW communications system, the UE-generated uplink message on a resource indicated by the uplink grant.

An apparatus for wireless communication is described. The apparatus may include means for receiving an uplink grant on one of a plurality of beamformed transmissions in a mmW communications system, means for identifying a UE-generated uplink message for transmission, and means for transmitting, in the mmW communications system, the UE-generated uplink message on a resource indicated by the uplink grant.

Another apparatus for wireless communication is described. The apparatus may include a processor, memory in electronic communication with the processor, and instructions stored in the memory. The instructions may be operable to cause the processor to receive an uplink grant on one of a plurality of beamformed transmissions in a mmW communications system, identify a UE-generated uplink message for transmission, and transmit, in the mmW communications system, the UE-generated uplink message on a resource indicated by the uplink grant.

A non-transitory computer readable medium for wireless communication is described. The non-transitory computer-readable medium may include instructions operable to cause a processor to receive an uplink grant on one of a plurality of beamformed transmissions in a mmW communications system, identify a UE-generated uplink message for transmission, and transmit, in the mmW communications system, the UE-generated uplink message on a resource indicated by the uplink grant.

A method of wireless communication is described. The method may include identifying a UE-generated uplink message for transmission, receiving at least one beamformed synchronization signal, identifying a dedicated resource for UE-generated uplink message transmissions that is associated with the at least one received beamformed synchronization signal, and transmitting the UE-generated uplink message on the dedicated resource.

An apparatus for wireless communication is described. The apparatus may include means for identifying a UE-generated uplink message for transmission, means for receiving at least one beamformed synchronization signal, means for identifying a dedicated resource for UE-generated uplink message transmissions that is associated with the at least one received beamformed synchronization signal, and means for transmitting the UE-generated uplink message on the dedicated resource.

Another apparatus for wireless communication is described. The apparatus may include a processor, memory in electronic communication with the processor, and instructions stored in the memory. The instructions may be operable to cause the processor to identify a UE-generated uplink message for transmission, receive at least one beamformed synchronization signal, identify a dedicated resource for UE-generated uplink message transmissions that is associated with the at least one received beamformed synchronization signal, and transmit the UE-generated uplink message on the dedicated resource.

A non-transitory computer readable medium for wireless communication is described. The non-transitory computer-readable medium may include instructions operable to cause a processor to identify a UE-generated uplink message for transmission, receive at least one beamformed synchronization signal, identify a dedicated resource for UE-generated uplink message transmissions that is associated with the at least one received beamformed synchronization signal, and transmit the UE-generated uplink message on the dedicated resource.

DETAILED DESCRIPTION

The described techniques relate to the transmission of a user equipment (UE)-generated uplink message from a UE to a base station in a wireless communications system that supports directional beamformed transmissions. In some cases, the UE-generated uplink message may include a scheduling request (SR) or a beam failure recovery request (BFRR). For example, the UE may be configured to operate using millimeter wave (mmW) spectrum and may communicate with a base station using directional beamformed transmissions. To send an uplink message to the base station, the UE may first transmit an SR to request uplink resources. Due to the directionality of beamformed transmissions, the UE and base station may coordinate to ensure that the SR sent by the UE is received by the base station. For example, the UE may utilize different transmission modes to convey the SR to the base station. In a scheduled mode, the UE may convey the SR along with another, pre-scheduled uplink transmission (e.g., uplink control messages or feedback messages). In an autonomous mode, the UE may convey the SR on resources that have been reserved for SR transmissions. The UE may select between the different modes depending on certain characteristics of the SR or the data associated with the SR, a state of the UE, a configuration from the network, or some other factor. In some cases, the UE and base station may operate in a spectrum other than the mmW spectrum (e.g., a spectrum with frequencies below six GHz (sub-6 GHz)).

Aspects of the disclosure are initially described in the context of a wireless communications system. Examples of uplink transmission messages are illustrated to describe SR transmission using an autonomous mode and a scheduled mode. Aspects of the disclosure are further illustrated by and described with reference to apparatus diagrams, system diagrams, and flowcharts that relate to SR transmission for directional beam access.

Figure 1:
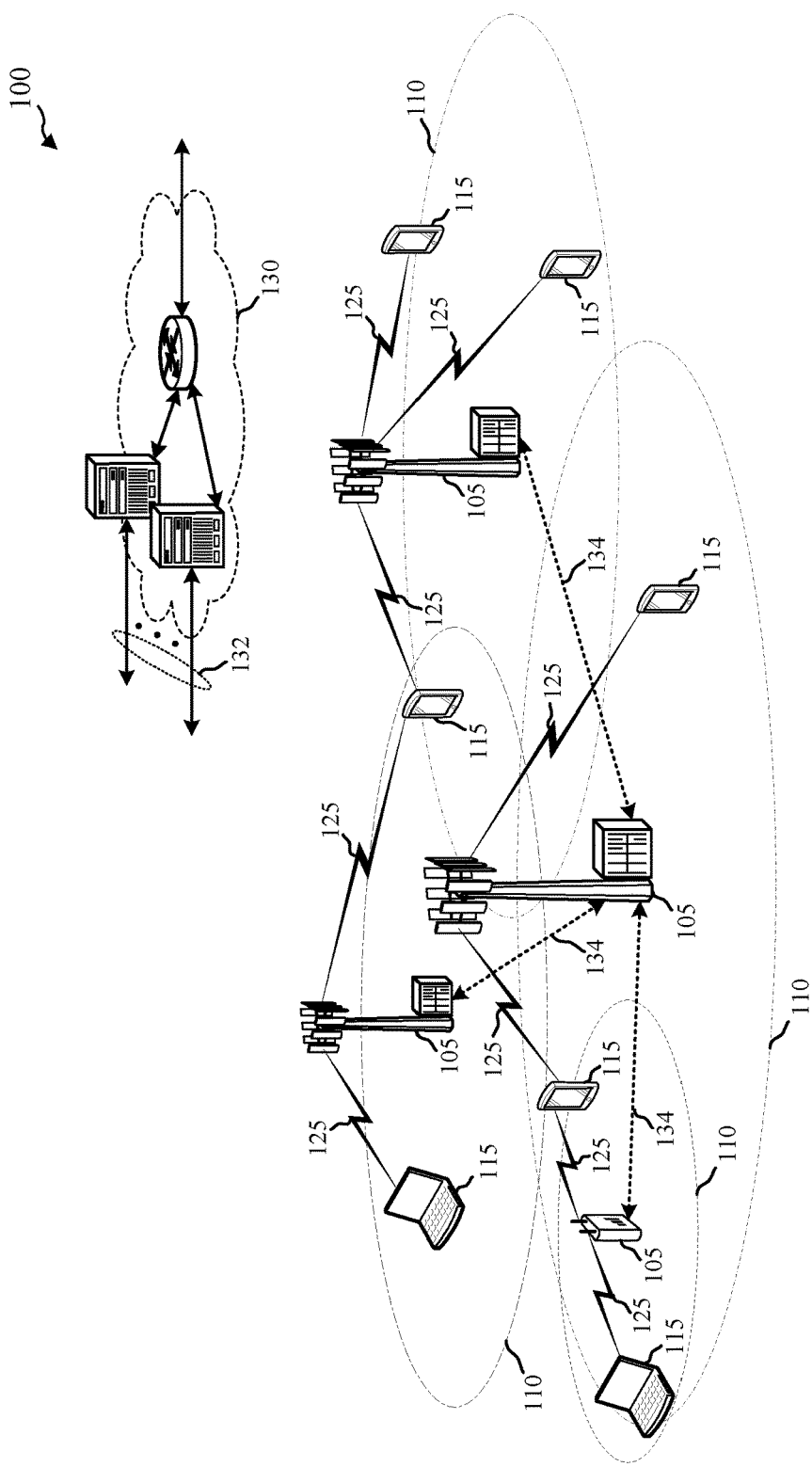
FIG. 1 illustrates an example of a wireless communications system that supports scheduling request (SR) transmission for directional beam access in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. In other examples (e.g., in a next generation new radio (NR) or 5G network), the wireless communications system 100 may include a number of smart radio heads (RHs) in communication with a number of access node controllers (ANCs), where a set of one or more RHs, in communication with an ANC, defines a base station (e.g., an eNB). In accordance with aspects of the disclosure, the wireless communications system 100 may support communication over mmW frequency ranges and using beamforming techniques to convey control information such as a SR.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The wireless communication system 100 may utilize extremely high frequency (EHF) portions of the spectrum (e.g., from 30 GHz to 300 GHz). This region may also be known as the millimeter band (e.g., mmW spectrum), since the wavelengths range from approximately one millimeter to one centimeter in length. Devices that support mmW communication (e.g., UEs 115 and base station 105) may have multiple antennas to allow beamforming. That is, a base station 105 may use multiple antennas or antenna arrays to conduct beamforming operations for directional communications with a UE 115. In some cases, the wireless communication system 100 may utilize a sub-6 GHz spectrum (e.g., frequencies below 6 GHz).

Beamforming (which may also be referred to as spatial filtering) is a signal processing technique that may be used at a transmitter (e.g., a base station 105 or a UE 115) to shape and/or steer an overall antenna beam in the direction of a target receiver (e.g., a UE 115 or a base station 105). This may be achieved by combining elements in an antenna array in such a way that transmitted signals at particular angles experience constructive interference while others experience destructive interference. Signals may be transmitted multiple times in different directions (e.g., each transmission may be beamformed differently). Transmitted beams may also be swept over an entire sector to reach every UE 115 in a geographic coverage area 110.

A UE 115 attempting to access the wireless communications network 100 may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request indicator channel PHICH configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

Transmission of synchronization signals by a base station (e.g., including PSSs, SSSs and extended synchronization signals (ESSs)) may be used by a UE 115 to synchronize its timing to a base station 105. In communications systems using mmW frequency ranges, synchronization signals may be beamformed to meet a certain link budget (e.g., an accounting of gains and losses associated with transmitters and receivers when communicating over a medium). Furthermore, other types of downlink control messages (e.g., MIBs, SIBs, uplink grants, measurement reference signals, beam measurement reference signals) may be beamformed and transmitted to a UE 115.

During a synchronization period (e.g., a duration of synchronization signal transmissions), a base station 105 may transmit on all of its antenna ports for several symbols.

For example, the synchronization period may last for 14 symbols of a subframe, and a beam direction of each antenna port may change from symbol to symbol. Thus, beams from all base station antenna ports may cover all relevant spatial directions of a cell during the transmission of synchronization signal. Beam sweeping during the synchronization period may also be used to deliver a broadcast signal, such as a PBCH signal. In some cases, PSS, SSS, and PBCH signals may be multiplexed in a transmission, such as a synchronization transmission, using frequency division multiplexing (FDM).

In some cases, synchronization signals may contain multiple beam reference signals that correspond to each antenna port. The beam reference signals may allow a UE 115 to measure a received signal strength indicator (RSSI) and the frequency selectivity of each beam, and thus allow a UE 115 to identify a radio channel along which the beam travels from the base station 105. As an example, a base station 105 may assign beam reference signals to different (or disjoint) sets of subcarriers to enable a UE 115 to distinguish between the beam reference signals associated with different antenna ports. Additionally or alternatively, each antenna port may transmit a broadcast signal using a set of subcarriers different from those associated with beam reference signals, where each antenna port may transmit the broadcast signal in the same set of subcarriers.

The wireless communications system 100 may utilize TDD for uplink and downlink transmissions. For example, downlink and uplink transmission may take place in different, non-overlapping time resources, and each time resource may be assigned a transmission direction (e.g., uplink or downlink). In some cases, the time resources may be assigned dynamically to match traffic usage in a network (e.g., dynamic TDD). In some other cases, the transmission direction (uplink or downlink) of a time resource may be changed from one frame to the next. In some cases of dynamic TDD operation, a base station 105 may signal a UE 115 to transmit an uplink autonomous transmission or SR in a pre-configured time duration (e.g., RACH slot or other uplink slot) through a broadcast signal or RRC signaling. In some cases, the time duration may consist of the last few symbols of a slot or the entire duration of a slot.

In some examples, when using a directional access procedure (e.g., an access procedure in a system using directional beamformed transmissions), a UE 115 and base station 105 may synchronize in a direction before communications can be successfully transmitted between them. For example, a base station 105 may prepare a receiving beam in the direction of a beamformed signal to receive incoming transmissions from a UE 115 on a beamformed signal. In some examples, the beamformed signal may be associated with one or multiple beam directions. If a UE 115 and base station 105 are aligned in different directions, an uplink message (e.g., a SR) may be unsuccessfully received at the base station 105.

In some examples, a SR may be configured in a time duration (e.g., uplink slot or subframe) assigned for physical random access channel (PRACH) or RACH transmissions. When using a directional access procedure, the PRACH/RACH resource may be paired with a downlink beam conveyed by synchronization signals (e.g., beam pairing). In that case, the SR resource may be frequency or code division multiplexed (FDM or CDM) with a PRACH/RACH resource, enabling the base station 105 to detect both PRACH/RACH and SR transmissions. However, the periodicity of a PRACH/RACH time duration (e.g., a subframe every 20 ms) may be unsatisfactory for SR transmission in certain cases.

In accordance with aspects of the present disclosure, a UE 115 may transmit a SR to a base station 105 using a scheduled mode or an autonomous mode. In a scheduled mode, a UE 115 may convey the SR to a base station 105 along with another uplink message (e.g., a control message). In an autonomous mode, the UE 115 may transmit the SR on resources that are reserved for SR transmission. In some examples, a UE 115 may select a mode and switch between the two transmission modes depending on characteristics of the SR or data associated with the SR.

Figure 2:
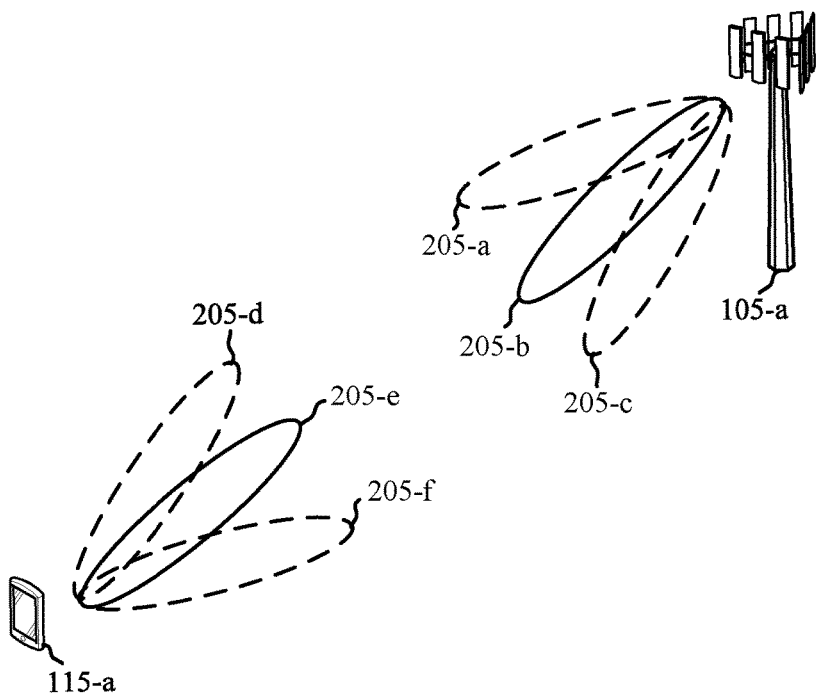
FIG. 2 illustrates an example of a wireless communications system that supports SR transmission for directional beam access in accordance with aspects of the present disclosure.

FIG. 2 illustrates an example of a wireless communications system 200 that supports SR transmission for directional beam access in accordance with aspects of the present disclosure. The wireless communications system 200 may include a UE 115-*a* and a base station 105-*a*, which may be examples of the UE 115 and base station 105 described with reference to FIG. 1. UE 115-*a* and base station 105-*a* may communicate using directional beams and may operate using mmW spectrum, for example. In some cases, the UE and base station may operate in a spectrum other than the mmW spectrum (e.g., a spectrum with frequencies below six GHz (sub-6 GHz)). The wireless communications system 200 illustrates aspects of conveying a SR using different modes of transmission between UE 115-*a* and base station 105-*a*.

As discussed above, when operating using mmW frequencies, base station 105-*a* and/or UE 115-*a* may utilize beamforming techniques to increase the strength of wireless signals as a result of additional path loss. For example, base station 105-*a* may transmit a plurality of downlink beamformed signals 205 that carry data and/or control information. For example, base station 105-*a* may transmit a beam reference signal (BRS), a beam refinement reference signal (BRRS), a beam measurement reference signal, a channel state information reference signal (CSI-RS), a beam synchronization signal, an uplink grant, a broadcast signal (e.g., a MIB or SIB), or any number of other types of downlink messages. Beamformed signals 205 (e.g., beamformed signal 205-*a*, beamformed signal 205-*b*, or beamformed signal 205-*c*) may be transmitted in a shaped or directional manner where each beamformed signal 205 is transmitted in a different direction. Beamformed signals 205 may be associated with an antenna port precoder configuration (e.g., an analog and/or digital beamforming stage that determines the direction and/or shape of each beamformed signal 205) as discussed with reference to FIG. 1. For example, beamformed signal 205-*a* may be transmitted in a first direction or shape, beamformed signal 205-*b* may be transmitted in a second direction or shape, and beamformed signal 205-*c* may be transmitted in a third direction or shape. The beamformed signals 205 may be transmitted in a sweeping pattern. In addition, UE 115-*a* may transmit and base station 105-*a* may receive one or more beamformed signals 205 (e.g., beamformed signal 205-*d*, beamformed signal 205-*e*, and beamformed signal 205-*f*).

When operating in mmW spectrum, rapid changes in channel conditions may prompt frequent beam changes. If UE 115-*a* and base station 105-*a* are not aligned in their transmit and receive beam directions (e.g., beamformed signal 205-*a* and beamformed signal 205-*f*), a SR transmission may be unsuccessful. In some examples, base station 105-*a* may gauge the direction of a beam from UE 115-*a*, and subsequently prepare to receive it (e.g., beamformed signal 205-*b* and beamformed signal 205-*e*).

In wireless communications system 200, UE 115-a may transmit a SR message to the base station 105-a requesting resources for an uplink transmission on a beamformed signal 205. The SR may be in response to an event at UE 115-a (e.g., a change in buffer status report (BSR) or uplink data arrival from a logical channel group). In some examples, the SR may convey the request for resources using one or multiple bits. Additionally or alternatively, the UE 115-a may transmit a BFRR to the base station 105-a in the case of a beam failure or beam deterioration. In accordance with aspects of the present disclosure, the UE 115-a may transmit a BFRR using similar techniques or under similar circumstances as transmitting an SR message, as described in more detail below. Since both an SR and a BFRR may include requests for uplink resources in response to an unpredictable or unforeseen circumstance, base station 105-a may not know when to expect either one of these UE-generated uplink messages from UE 115-a.

In some examples, UE 115-a may combine or otherwise convey a SR along with an uplink transmission that has already been scheduled. The uplink transmission may include control information and be a dynamically or periodically scheduled resource. This technique for conveying SR to the base station 105-a may be referred to as a scheduled mode of SR transmission. For example, in some cases the SR may be conveyed along with a HARQ acknowledgment. The SR may also be conveyed along with a channel state feedback (CSF) report, or a beam measurement report, or a sounding reference signal (SRS) transmission, a physical uplink control channel transmission, or an uplink measurement reference signal transmission, or any other uplink transmission that has been scheduled by base station 105-a. The SR indication may be multiplexed in time, frequency, code or otherwise combined with or appended to the previously scheduled uplink transmission. Furthermore, in some cases the SR may be transmitted in one or more OFDM symbols.

In the example of a scheduled mode SR transmission, SR information may be indicated through a SRS. As described above, UE 115-a may convey an SRS using one of a number of sequences (e.g., Zadoff-Chu sequences). In some cases, UE 115-a may convey SR information by modifying the sequence, applying a cyclic shift to the signal in a predefined way, or some combination thereof, to convey the SR information in addition to or instead of the SRS information. In some examples, some of the sequences available to convey a SRS may be reserved to instead convey SR information.

In some cases, UE 115-a may transmit a SR autonomously (e.g., in the absence of an uplink grant). In such cases, base station 105-a may configure resources dedicated for SR transmissions, and UE 115-a may transmit a SR to base station 105-a on those resources. This technique of transmitting the SR may be referred to as an autonomous mode of SR transmission. In some cases, the dedicated resources for SR transmissions differ from resources reserved for RACH transmissions. For example, the dedicated resources may use separate time slots (e.g., multiplexed in the time domain) or may use the same time slots but different frequency resources (e.g., multiplexed in the frequency domain) as resources for RACH transmissions. The dedicated resources for SR transmissions may be differentiated from the resources for RACH transmissions by using different codes or sequences (e.g., multiplexed in the code domain).

Alternatively, the dedicated resources for SR transmissions may be RACH resources, but UE 115-a may use special RACH sequences that convey the SR rather than initiate a RACH procedure. For example, the sequence transmission could indicate a positive SR (e.g., SR value showing that UE 115-a has uplink data to be transmitted), and a lack of the sequence transmission could indicate negative SR (e.g., SR value showing UE 115-a has no uplink data to be transmitted). The RACH sequences utilized by UE 115-a may be contention-based or contention-free.

In some cases, the resources configured for SR transmissions may be indicated by or otherwise associated with a measurement reference signal or a synchronization signal. Furthermore, the measurement reference signals or synchronization signals may carry a beam direction or beam identification (ID) for the beamformed signal 205, which may be associated with the configured SR resource. In some examples, UE 115-a may transmit on multiple dedicated resources. For example, UE 115-a may receive two downlink directional beams with equal or nearly equal signal strength, and UE 15-a may transmit the SR on both the corresponding uplink beam directions on the dedicated resources. In some cases, the dedicated resources configured for SR transmissions may be dynamically selected and activated or deactivated over time.

In some cases, UE 115-a may select between the scheduled mode and the autonomous mode for SR transmissions based on certain characteristics associated with the SR, certain characteristics associated with data to be transmitted, a state of the UE 115-a or some combination of these factors. For example, the number of bits used for the SR transmission may determine the mode utilized by UE 115-a. In some examples, UE 115-a may use the scheduled mode (e.g., send the SR along with SRS) if the number of bits for the SR transmission is at or below a threshold (e.g., 1 bit). Alternatively, if the number of bits used for the SR transmission is at or above a threshold (e.g., 2 or more bits), then UE 115-a may instead use the autonomous mode to convey the SR. Additionally or alternatively, a base station 105-a may configure the UE 115-a for only autonomous mode or only scheduled mode.

In some cases, UE 115-a may select the scheduled mode or the autonomous mode based on whether the SR is a first transmission of the SR (e.g., a new SR transmission), or a retransmission of the SR, or a retransmission attempt above a predetermined threshold. For example, if the SR is a first transmission of the SR, then UE 115-a may use the scheduled mode to convey the SR. In some examples, the scheduled mode is a default mode of operation for a first transmission attempt of the SR. If however, the SR is a retransmission of a previous SR, then UE 115-a may select the autonomous mode to transmit the SR. In some examples, UE 115-a may attempt several retransmissions (up to a certain threshold) of the SR before selecting the autonomous mode. In some cases, this may involve switching from one mode to another (e.g., from scheduled to autonomous). For example, in some cases, UE 115-a may transmit a SR a first time while in the scheduled mode. However, if UE 115-a does not receive an uplink grant, it may retransmit the SR. After multiple retransmission attempts, UE 115-a may switch to the autonomous mode. In some other cases, UE 115-a may select the autonomous mode due to non-periodic uplink transmissions. In some examples, UE 115-a may select the transmission mode that allows it to transmit the SR the soonest (e.g., based on when the next transmission opportunity is between scheduled or autonomous mode).

UE 115-a may select the scheduled mode or the autonomous mode based on the priority level of the SR or the associated data. For example, UE 115-a may have different data streams from different logical channels with different priority levels. If a data stream from a higher priority level is to be sent, UE 115-*a* may select the SR transmission mode that results in the earliest transmission. For example, UE 115-*a* may be operating in the scheduled mode to transmit the SR associated with a first data stream, and then upon receiving a data stream with a higher logical channel group priority level, UE 115-*a* may then switch to the autonomous mode to transmit the new SR.

In some examples, UE 115-*a* may transmit an indication to base station 105-*a* that helps base station 105-*a* predict when the next SR may be sent. For example, UE 115-*a* may transmit a BSR that indicates when an SR may be needed. Such an indication may facilitate base station 105-*a* to efficiently assign dedicated resources for SR transmission or transmit an uplink grant indicating uplink resources to which an SR may be appended.

Figure 3:
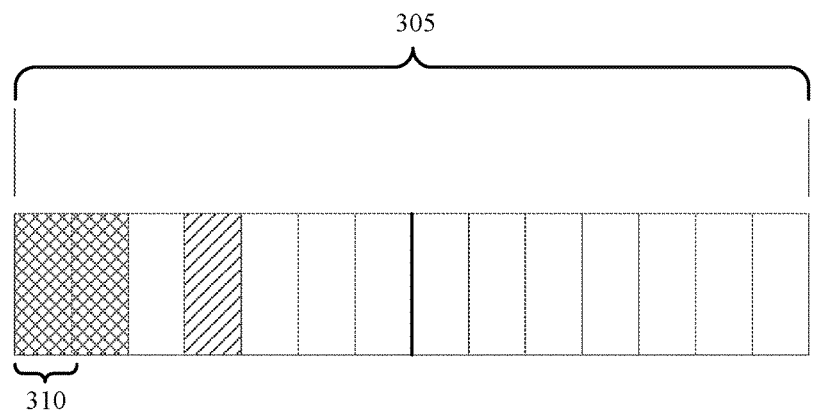
FIG. 3 illustrates an example of an uplink message that supports SR transmission for directional beam access in accordance with aspects of the present disclosure.
Figure 3:
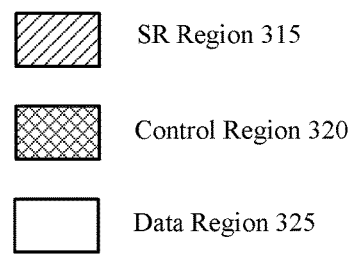

FIG. 3 illustrates an example of a wireless communications message 300 that supports SR transmission for directional beam access in accordance with aspects of the present disclosure. The wireless communications message 300 may contain an uplink slot 305 that is sent from a UE 115 to a base station 105. The uplink slot 305 may include time resources such as one or more time increments 310 (e.g., OFDM symbols). However, it should be understood that other increments of time may be used, depending on the type of slot or type of wireless system employed. The wireless communications message 300 may illustrate an example of resources dedicated for SR transmissions in accordance with an autonomous SR transmission mode, as described with reference to FIG. 2. While not shown, it is to be understood that a UE 115 may perform similar techniques for similar circumstances with respect to an SR as described below for a BFRR. Both UE-generated requests for uplink resources may follow similar steps.

The uplink slot 305 may include a SR region 315, a control region 320, and a data region 325. Each region may occupy one or more time resources. The control region 320 may contain uplink control information such as measurement, reference, feedback, or synchronization signals. Data region 325 may contain payload data.

SR region 315 may correspond with dedicated resources for SR transmissions. It should be understood that SR region 315 may be located in a different part of the slot 305 as illustrated in FIG. 3 and/or may occupy more or less time resources than illustrated. The dedicated resources illustrated by SR region 315 may have been reserved by the network (e.g., a base station 105) and may have been indicated to a UE 115 through a downlink message (e.g., a downlink synchronization message, a measurement reference signal, etc.). The downlink message indicating the location of SR region 315 may be associated with a beam direction or beam identification so that a UE 115 may associate the dedicated resources with the beam direction, thereby allowing a receiving base station 105 to properly receive and decode the SR transmitted on SR region 315.

SR region 315 may be different than resources reserved for RACH (e.g., RACH slots). However, in some examples, SR region 315 may overlap with or otherwise be associated with RACH resources, but in such examples, a UE 115 may convey a special RACH sequence that conveys SR information rather than or in addition to initiating a RACH procedure. In some cases, the resource configured for SR (e.g., SR region 315) may be dynamically selected, moved, activated, or deactivated over time (e.g., from slot to slot).

Figure 4A:
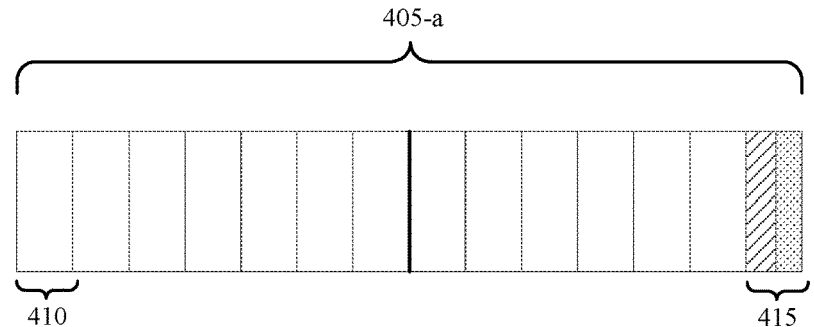
FIGS. 4A and 4B illustrate examples of an uplink message that supports SR transmission for directional beam access in accordance with aspects of the present disclosure.

FIG. 4A illustrates an example of a wireless communications message 401 that supports SR transmission for directional beam access in accordance with aspects of the present disclosure. Wireless communications message 401 may contain an uplink slot 405-*a*, which may be transmitted from a UE 115 to a base station 105. The uplink slot 405-*a* may include time resources such as one or more time increments 410 (e.g., OFDM symbols). It should be understood that other increments of time may be used, depending on the type of slot or type of wireless system employed. Wireless communications message 401 may illustrate an example conveying SR along with an uplink message in accordance with a scheduled SR transmission mode, as described with reference to FIG. 2. While not shown, it is to be understood that a UE 115 may perform similar techniques for similar circumstances with respect to an SR as described below for a BFRR. Both UE-generated requests for uplink resources may follow similar steps.

The uplink slot 405-*a* may be divided into a separate data region 425-*a*, and a region 415 further comprised of a control region 420-*a* and a SR region 430-*a*. Each region may occupy one or more time resources. The resources of uplink slot 405-*a* may have been scheduled and indicated by an uplink grant sent from a base station 105 to a UE 115.

As described with reference to FIG. 2, a UE 115 may convey SR information along with control information or on a control channel of slot 405-*a* in accordance with a scheduled mode of transmission. As illustrated, control region 420-*a* and SR region 430-*a* may be combined together using TDD within a single time resource. The proximity of control region 420-*a* and SR region 430-*a* is intended to illustrate the conveyance of SR information along with the control information that was previously scheduled for uplink transmission. As described herein, the SR information may be multiplexed with the control information (e.g., TDD or FDD), may be appended to the control information adjacent to time or frequency resources already reserved for the control information, or may be otherwise conveyed by or along with the control information.

The control information located in control region 420-*a* may include an SRS. In some examples, control region 420-*a* represents a control channel (e.g., a PUCCH). A UE 115 may indicate SR information through the SRS signal through use of different sequences, cyclic shifts, or a combination of both, that convey the SR in addition to conveying the SRS information. Control region 420-*a* may represent other uplink messages other than SRS, such as a HARQ acknowledgment, a CSF report, a beam measurement report, or an uplink measurement reference signal transmission. Similar to the SRS, the other types of control information may be used to convey the SR information in accordance with a scheduled transmission mode.

Also, although SR region 430-*a* and control region 420-*a* are shown as non-overlapping and occupying a single symbol, SR region 430-*a* may be multiplexed (e.g., TDD) or otherwise combined with control region 420-*a*. Furthermore, in some cases SR region 430-*a* may occupy more than one OFDM symbols.

Figure 4B:
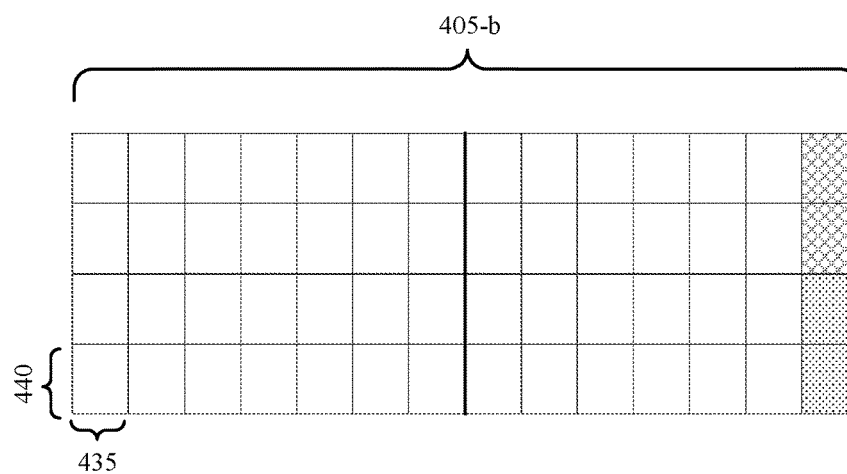

FIG. 4B illustrates an example of a wireless communications message 402 that supports SR transmission for directional beam access in accordance with aspects of the present disclosure. Wireless communications message 402 may be an additional example of wireless communications message 401 described with reference to FIG. 4A. The wireless communications message 402 may contain an uplink slot 405-*b*, which may be transmitted from a UE 115 to a base station 105. Uplink slot 405-*b* may include time resources such as one or more time increments 435 (e.g., OFDM symbols). It should be understood that other increments of time may be used, depending on the type of slot or type of wireless system employed. Wireless communications message 402 may illustrate an example of conveying SR along with an uplink message in accordance with a scheduled SR transmission mode, as described with reference to FIG. 2. While not shown, it is to be understood that a UE 115 may perform similar techniques for similar circumstances with respect to an SR as described below for a BFRR. Both UE-generated requests for uplink resources may follow similar steps.

The uplink slot 405-b may include time resources and frequency resources such as one or more time increments 435 and one or more frequency increments 440 (e.g., subcarriers). It should be understood that other increments of time and frequency may be used, depending on the type of slot or type of wireless system employed.

The uplink slot 405-b may be divided into a separate data region 425-b, a control region 420-b, and a SR region 430-b. Each region may occupy one or more time and frequency resources. As depicted, SR region 430-b and control region 420-b may occupy the same time increment 435, but different frequency increments 440. Similar to FIG. 4A described above, the proximity of SR region 430-b and control region 420-b is intended to illustrate the conveyance of SR information in SR region 430-b by or along with the control information in control region 420-b. Also, as described above, the control information in control region 420-b may include SRS, a HARQ acknowledgment, a CSF report, a beam measurement report, or an uplink measurement reference signal transmission.

Also, although SR region 430-a and control region 420-a are shown as non-overlapping and occupying separate frequency increments 440, SR region 430-b may be multiplexed (e.g., FDM) or otherwise combined with control region 420-b. Furthermore, in some cases SR region 430-b may occupy more than one OFDM symbols.

Figure 5:
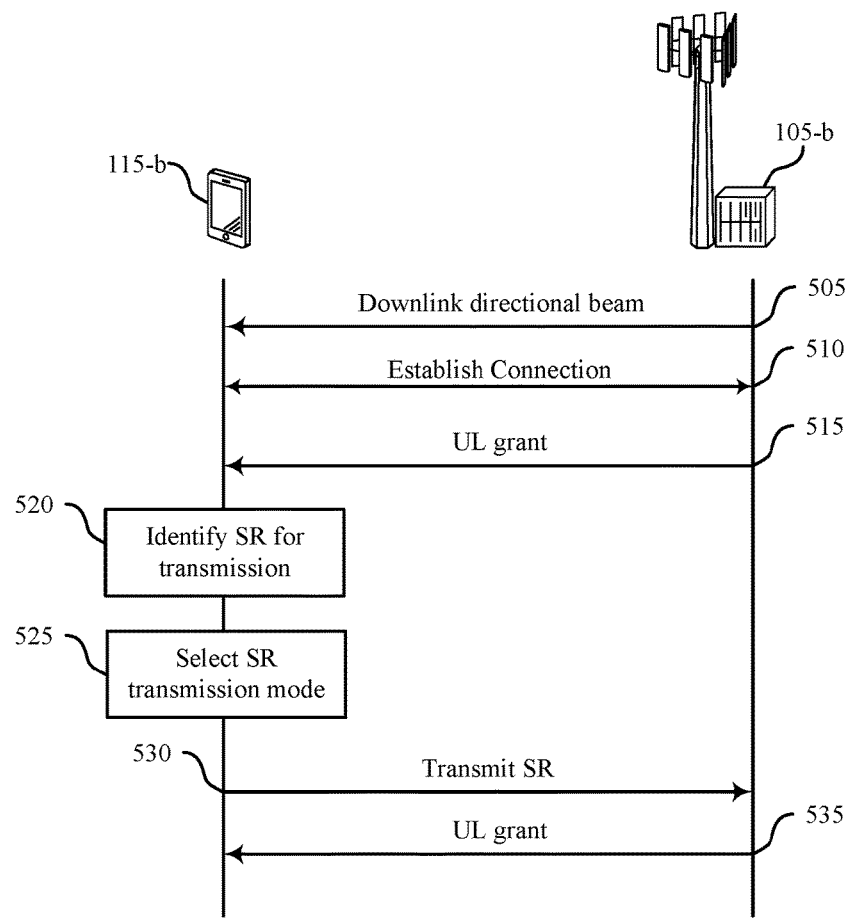
FIG. 5 illustrates an example of a process flow that supports SR transmission for directional beam access in accordance with aspects of the present disclosure.

FIG. 5 illustrates an example of a process flow 500 for SR transmission for directional beam access in accordance with aspects of the present disclosure. The process illustrated by process flow 500 may be implemented by a UE 115-b and a base station 105-b, which may be examples of a UE 115 and base station 105 described with reference to FIGS. 1 and 2. In some examples, the process illustrated by flow diagram 500 may be implemented in a wireless system employing mmW communications or a sub-6 GHz spectrum.

At step 505, UE 115-b may receive a downlink transmission on a directional beam (e.g., a beamformed signal) from base station 105-b. The downlink transmission may include a synchronization signal, MIB, SIB, or any other type of downlink control message described with reference to FIG. 2. UE 115-b may use information indicated in the downlink transmission (e.g., timing synchronization, location of access resources, etc.) to establish a connection with base station 105-b.

In some examples, base station 105-b may reserve dedicated resources for a UE-generated uplink message transmission (e.g., an SR or a BFRR) and may convey this information in the downlink transmission at step 505. As discussed below, UE 115-b may identify these dedicated resources and may transmit an SR or BFRR on them in an autonomous transmission mode. In some examples, the downlink beamformed transmission includes an identification, and UE 115-b may associate the identification with the dedicated resources to establish a beam pair for subsequent SR or BFRR transmissions.

At step 510, a wireless connection may be established between UE 115-b and base station 105-b. Establishing a connection may include synchronizing timing, employing random access procedures, or the like.

At step 515, UE 115-b may receive an uplink grant from base station 105-b. In some cases, the received uplink grant may be in response to a previously transmitted UE-generated uplink message or may instead be in response to establishing a connection at step 510. The uplink grant at step 515 may indicate uplink resources for UE 115-b to use for a subsequent uplink transmission (e.g., an uplink data message, an uplink control message, or a combination thereof).

At step 520, UE 115-b may identify a UE-generated uplink message (e.g., an SR or a BFRR) for transmission. For example, an SR may be triggered by some event at UE 115-b such as a change in a BSR or the arrival of uplink data. Additionally or alternatively, a BFRR may be triggered by some event at UE 115-b, such as a case of a beam failure or beam deterioration. In some examples, UE 115-b may further identify one or more characteristics associated with the SR or BFRR. The characteristics of the SR may include the number of bits associated with the SR, whether the SR is a first transmission or a retransmission of the SR (or if a retransmission, how many retransmission attempts have occurred), or a priority level associated with the SR.

At step 525, UE 115-b may determine to transmit the UE-generated uplink message (e.g., the SR or BFRR) using the autonomous mode or scheduled mode based on the identified characteristic. For example, UE 115-b may select the scheduled mode for SR transmission if the number of bits associated with the SR fails to satisfy a predetermined threshold. In some examples, UE 115-b may select the autonomous mode if the number of bits associated with the SR satisfies a predetermined threshold.

In some examples, base station 105-b may configure UE 115-b to transmit in either the autonomous mode or the scheduled mode based on available resources, a predicted need for SR transmissions, network efficiency, or any number of other factors.

In some examples, UE 115-b may select the scheduled mode for SR transmission if the SR is a first transmission of the SR or if the SR is a retransmission of the SR, where the number of retransmission attempts of the SR retransmission fails to satisfy a predetermined threshold. UE 115-b may select the autonomous mode for SR transmission if the SR is a retransmission of the SR, where the number of retransmission attempts of the SR retransmission satisfies a predetermined threshold.

In some examples, UE 115-b may transmit the SR based on a priority level associated with the SR (e.g., a priority level of a logical channel group that triggered the SR). Based on the priority level, UE 115-b may transmit the SR using the autonomous mode if the autonomous mode permits transmission of the SR earlier than if the scheduled mode was used or transmit the SR using the scheduled mode if the schedule mode permits transmission of the SR earlier than if the autonomous mode was used.

At step 530, UE 115-b may transmit the SR to base station 105-b. In some cases, if UE 115-b selects SR transmission in autonomous mode, UE 115-b may transmit the SR on resources dedicated for SR transmission by base station 105-b (e.g., dedicated resources indicated in the downlink directional beam at step 505). Furthermore, in some examples, the association between the downlink directional beam and the dedicated resources may be used to transmit the SR at 530 so that base station 105-b knows what beam direction the SR is coming from.

In some examples, if UE 115-b selects SR transmission in scheduled mode, UE 115-b may transmit the SR on a scheduled uplink transmission. For example, the scheduled uplink transmission may be associated with the uplink grant received in step 515. The UE 115-b may multiplex, append, or otherwise convey the SR along with the uplink transmission as described with reference to FIG. 2. In some examples, the uplink message to which the SR is appended may include a HARQ acknowledgment, or CSF, or beam measurement report, or SRS, or an uplink measurement reference signal, or any other transmission scheduled by base station 105-b.

At step 535, base station 105-b may transmit an uplink grant to UE 115-b in response to the SR received in step 530.

Figure 6:
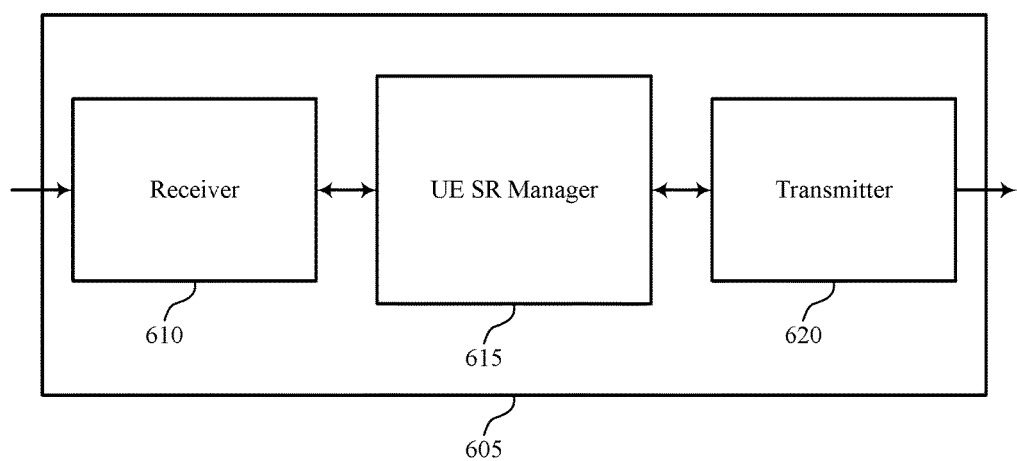
FIGS. 6 through 8 show block diagrams of a device that supports SR transmission for directional beam access in accordance with aspects of the present disclosure.

FIG. 6 shows a block diagram 600 of a wireless device 605 that supports SR transmission for directional beam access in accordance with various aspects of the present disclosure. Wireless device 605 may be an example of aspects of a UE 115 as described with reference to FIG. 1. Wireless device 605 may include receiver 610, UE SR manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to scheduling request transmission for directional beam access, etc.). Information may be passed on to other components of the device. The receiver 610 may be an example of aspects of the transceiver 935 described with reference to FIG. 9.

Receiver 610 may receive a downlink transmission on a downlink directional beam, or receive a grant indicating resources for an uplink transmission, or receive an uplink grant on one of a set of beamformed transmissions in a mmW communications system, or receive a beamformed synchronization signal. In some cases, the downlink transmission includes a synchronization signal, a MIB, or a SIB. The beamformed transmission may also occur in a sub-6 GHz spectrum.

UE SR manager 615 may be an example of aspects of the UE SR manager 915 described with reference to FIG. 9.

UE SR manager 615 may identify a UE-generated uplink message (e.g., an SR or a BFRR) for transmission, identify a characteristic associated with the UE-generated uplink message, and determine transmitting the UE-generated uplink message using a scheduled mode or an autonomous mode based on the identified characteristic. In some other cases, the UE SR manager 615 may also identify a UE-generated uplink message for transmission and identify a dedicated resource for UE-generated uplink message transmissions that is associated with the received beamformed synchronization signal.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Transmitter 620 may transmit the UE-generated uplink message using the scheduled mode or the autonomous mode. Furthermore, Transmitter 620 may transmit the UE-generated uplink message on the dedicated resources using the autonomous mode, or transmit the UE-generated uplink message on the resources using the scheduled mode. In some other cases, Transmitter 620 may transmit the second UE-generated uplink message using the scheduled mode or the autonomous mode.

Figure 7:
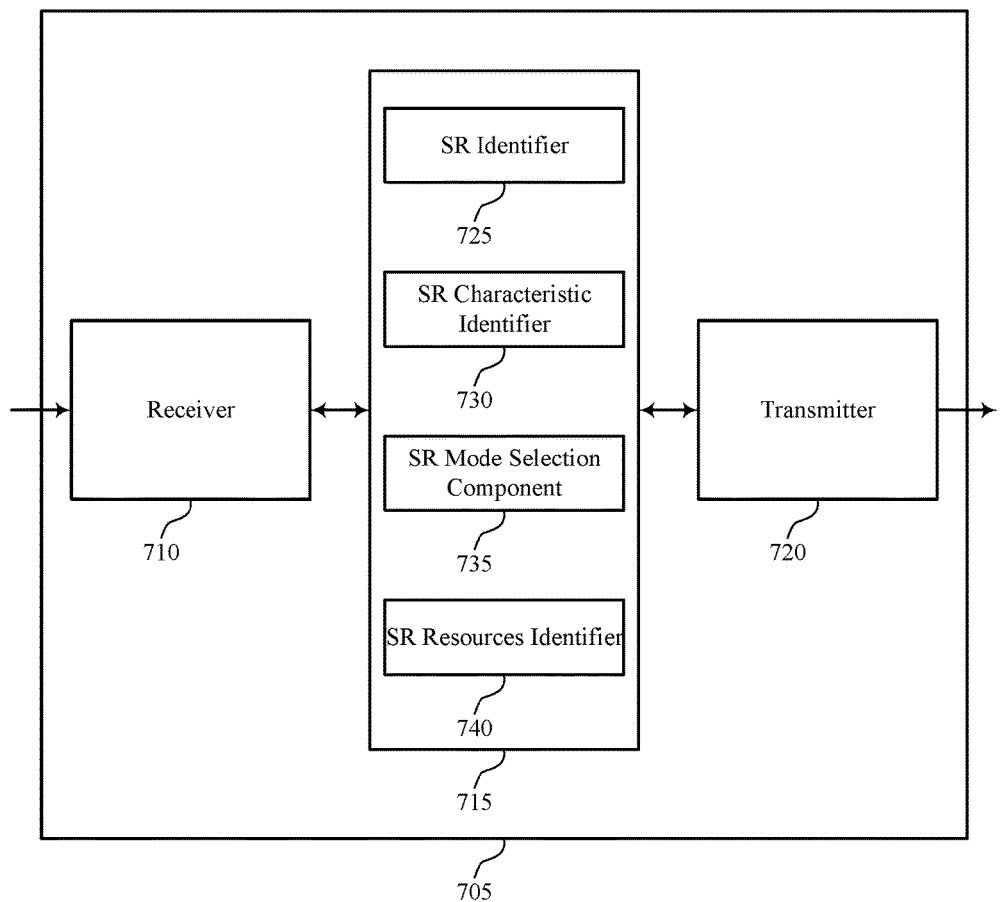

FIG. 7 shows a block diagram 700 of a wireless device 705 that supports SR transmission for directional beam access in accordance with various aspects of the present disclosure. Wireless device 705 may be an example of aspects of a wireless device 605 or a UE 115 as described with reference to FIGS. 1 and 6. Wireless device 705 may include receiver 710, UE SR manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to scheduling request transmission for directional beam access, etc.). Information may be passed on to other components of the device. The receiver 710 may be an example of aspects of the transceiver 935 described with reference to FIG. 9.

UE SR manager 715 may be an example of aspects of the UE SR manager 915 described with reference to FIG. 9.

UE SR manager 715 may also include SR identifier 725, SR characteristic identifier 730, SR mode selection component 735, and SR resources identifier 740.

SR identifier 725 may identify a UE-generated uplink message (e.g., an SR or a BFRR) for transmission and identify a second UE-generated uplink message for transmission.

SR characteristic identifier 730 may identify a characteristic associated with an SR. In some cases, the identified characteristic includes a number of bits associated with the SR. In some cases, the identified characteristic includes an indication of whether the SR is a retransmission of the SR. In some cases, the identified characteristic includes a priority level associated with the SR.

SR mode selection component 735 may determine to transmit the SR using a scheduled mode or an autonomous mode based on the identified characteristic. In some cases, SR mode selection component 735 may determine to transmit the SR using the scheduled mode if the number of bits fails to satisfy a predetermined threshold. In some cases, SR mode selection component 735 may determine to transmit the SR using the autonomous mode if the number of bits satisfies a predetermined threshold.

In some cases, SR mode selection component 735 may determine to transmit the SR using the scheduled mode if the SR is a first transmission of the SR or if the SR is a retransmission of the SR, where a number of retransmission attempts of the retransmission of the SR fails to satisfy a threshold. In some cases, SR mode selection component 735 may determine to transmit the SR using the autonomous mode if the SR is a retransmission of the SR, where a number of retransmission attempts of the retransmission of the SR satisfies a threshold.

In some cases, SR mode selection component 735 may determine to transmit the SR using the autonomous mode if the autonomous mode permits transmission of the SR earlier than if the scheduled mode was used. In some cases, SR mode selection component 735 may determine to transmit the SR using the scheduled mode if the scheduled mode permits transmission of the SR earlier than if the autonomous mode was used. In some cases, SR mode selection component 735 may determine to switch from the scheduled mode to the autonomous mode or from the autonomous mode to the scheduled mode.

SR resources identifier 740 may identify dedicated resources for UE-generated uplink message transmissions and identify a dedicated resource for UE-generated uplink message transmissions that is associated with the received beamformed synchronization signal. In some cases, the dedicated resources are different from resources reserved for RACH transmissions. In some cases, the dedicated resources are resources reserved for RACH transmissions, and where transmitting the UE-generated uplink message includes transmitting a RACH sequence to indicate the UE-generated uplink message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
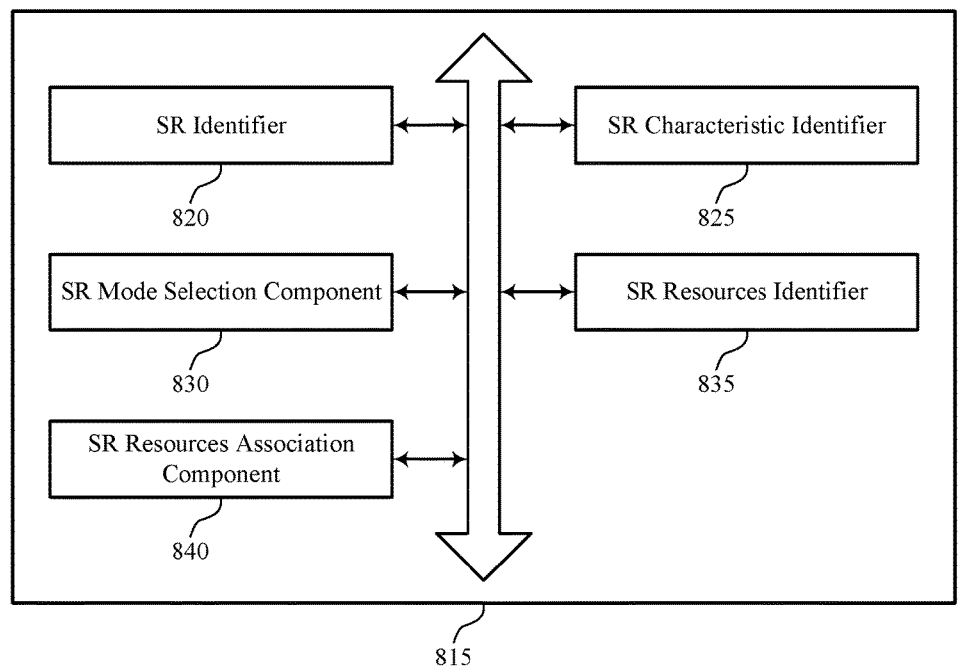

FIG. 8 shows a block diagram 800 of a UE SR manager 815 that supports SR transmission for directional beam access in accordance with various aspects of the present disclosure. The UE SR manager 815 may be an example of aspects of a UE SR manager 615, a UE SR manager 715, or a UE SR manager 915 described with reference to FIGS. 6, 7, and 9. The UE SR manager 815 may include SR identifier 820, SR characteristic identifier 825, SR mode selection component 830, SR resources identifier 835, and SR resources association component 840. Each of these modules may communicate, directly or indirectly, with one another (e.g., via one or more buses).

SR identifier 820 may identify a UE-generated uplink message (e.g., an SR or a BFRR) for transmission and identify a second UE-generated uplink message for transmission.

SR characteristic identifier 825 may identify a characteristic associated with an SR. In some cases, the identified characteristic includes a number of bits associated with the SR. In some cases, the identified characteristic includes an indication of whether the SR is a retransmission of the SR. In some cases, the identified characteristic includes a priority level associated with the SR.

SR mode selection component 830 may determine to transmit the SR using a scheduled mode or an autonomous mode based on the identified characteristic. In some cases, SR mode selection component 830 may determine to transmit the SR using the scheduled mode if the number of bits fails to satisfy a predetermined threshold. In some cases, SR mode selection component 830 may determine to transmit the SR using the autonomous mode if the number of bits satisfies a predetermined threshold.

In some cases, SR mode selection component 830 may determine to transmit the SR using the scheduled mode if the SR is a first transmission of the SR or if the SR is a retransmission of the SR, where a number of retransmission attempts of the retransmission of the SR fails to satisfy a threshold. In some cases, SR mode selection component 830 may determine to transmit the SR using the autonomous mode if the SR is a retransmission of the SR, where a number of retransmission attempts of the retransmission of the SR satisfies a threshold.

In some cases, SR mode selection component 830 may determine to transmit the SR using the autonomous mode if the autonomous mode permits transmission of the SR earlier than if the scheduled mode was used. In some cases, SR mode selection component 830 may determine to transmit the SR using the scheduled mode if the scheduled mode permits transmission of the SR earlier than if the autonomous mode was used. In some cases, SR mode selection component 830 may determine to switch from the scheduled mode to the autonomous mode or from the autonomous mode to the scheduled mode.

SR resources identifier 835 may identify dedicated resources for SR transmissions and identify a dedicated resource for SR transmissions that is associated with the received beamformed synchronization signal. In some cases, the dedicated resources are different from resources reserved for RACH transmissions. For example, the dedicated resources may use separate time slots, or may use the same time slots but different frequency or code (or sequence) resources as RACH transmissions. In some cases, the dedicated resources are resources reserved for RACH transmissions, and where transmitting the SR includes transmitting a specific RACH sequence to indicate the UE 115 identity and SR. In this case, the sequence transmission could indicate a positive SR (e.g., SR value showing that UE 115 has uplink data to be transmitted), and a lack of sequence transmission could indicate negative SR (e.g., SR value showing UE 115 has no uplink data to be transmitted).

SR resources association component 840 may associate the dedicated resources with the downlink directional beam and associate the SR with the uplink transmission. In some cases, the uplink transmission includes a HARQ acknowledgment, or a CSF report, or a beam measurement report, or SRS, or an uplink measurement reference signal, or a combination thereof. In some cases, the uplink transmission includes a SRS, and transmitting the SR on the SRS using the scheduled mode includes indicating a sequence associated with the SRS, a cyclic shift associated with the SRS, or both, that is indicative of the SR.

Figure 9:
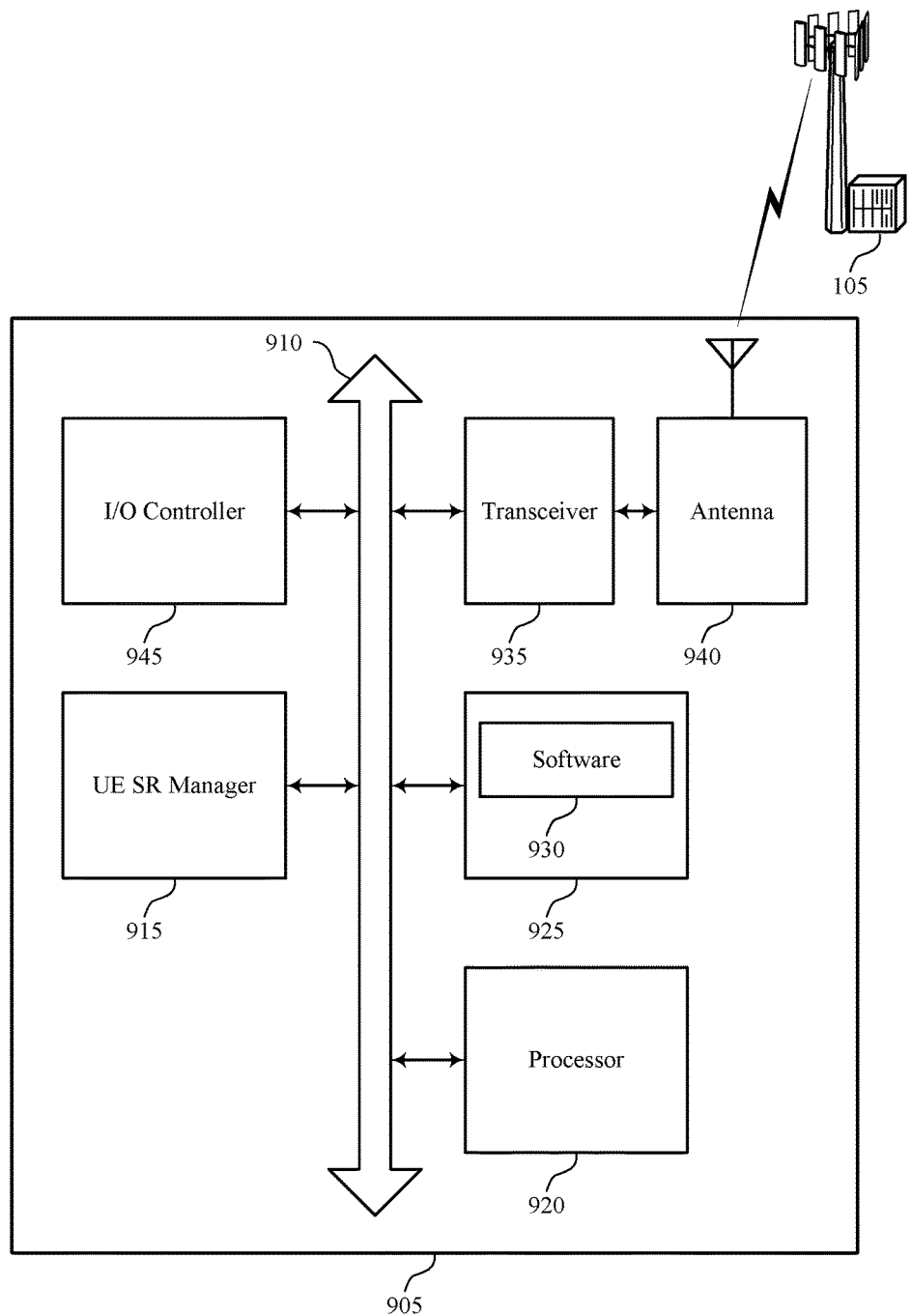
FIG. 9 illustrates a block diagram of a system including a user equipment (UE) that supports SR transmission for directional beam access in accordance with aspects of the present disclosure.

FIG. 9 shows a diagram of a system 900 including a device 905 that supports SR transmission for directional beam access in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE SR manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting SR transmission for directional beam access).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support scheduling request transmission for directional beam access. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
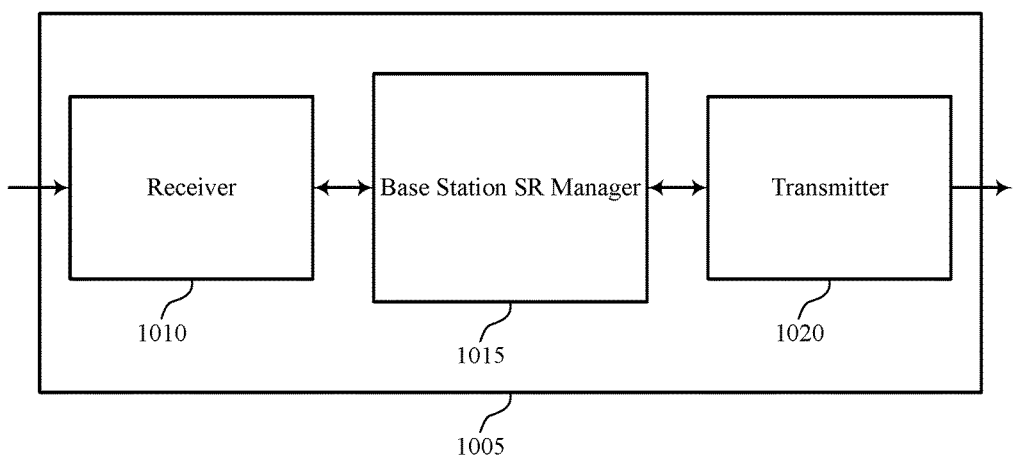
FIGS. 10 through 12 show block diagrams of a device that supports SR transmission for directional beam access in accordance with aspects of the present disclosure.

FIG. 10 shows a block diagram 1000 of a wireless device 1005 that supports SR transmission for directional beam access in accordance with various aspects of the present disclosure. Wireless device 1005 may be an example of aspects of a base station 105 as described with reference to FIG. 1. Wireless device 1005 may include receiver 1010, base station SR manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to scheduling request transmission for directional beam access, etc.). Information may be passed on to other components of the device. The receiver 1010 may be an example of aspects of the transceiver 1335 described with reference to FIG. 13.

Receiver 1010 may receive a UE-generated uplink message (e.g., an SR or a BFRR) using the scheduled mode or the autonomous mode. In some cases, receiver 1010 may receive an SR on the dedicated resources using the autonomous mode, or receive an SR on the resources using the scheduled mode. In some cases, receiver 1010 may receive a second SR using the scheduled mode or the autonomous mode, or receive, in the mmW communication system, the SR on a dedicated resource indicated by the uplink grant.

Base station SR manager 1015 may be an example of aspects of the base station SR manager 1315 described with reference to FIG. 13.

Base station SR manager 1015 may configure a UE 115 to identify a characteristic associated with a UE-generated uplink message (e.g., an SR or a BFRR) and configure the UE 115 to determine to transmit the SR or BFRR using a scheduled mode or an autonomous mode based on the identified characteristic. The base station SR manager 1015 may also configure a UE 115 to identify a UE-generated uplink message for transmission. The base station SR manager 1015 may also configure a UE 115 to identify a UE-generated uplink message for transmission and configure the UE 115 to identify a dedicated resource for UE-generated uplink message transmissions that is associated with the received beamformed synchronization signal.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Transmitter 1020 may transmit a downlink transmission on a downlink directional beam, or transmit a grant indicating resources for an uplink transmission, or transmit an uplink grant on one of a set of beamformed transmissions in a mmW communications system, or transmit a beamformed synchronization signal. In some cases, the downlink transmission includes a synchronization signal, a MIB, or a SIB. The beamformed transmission may also occur in a sub-6 GHz spectrum.

Figure 11:
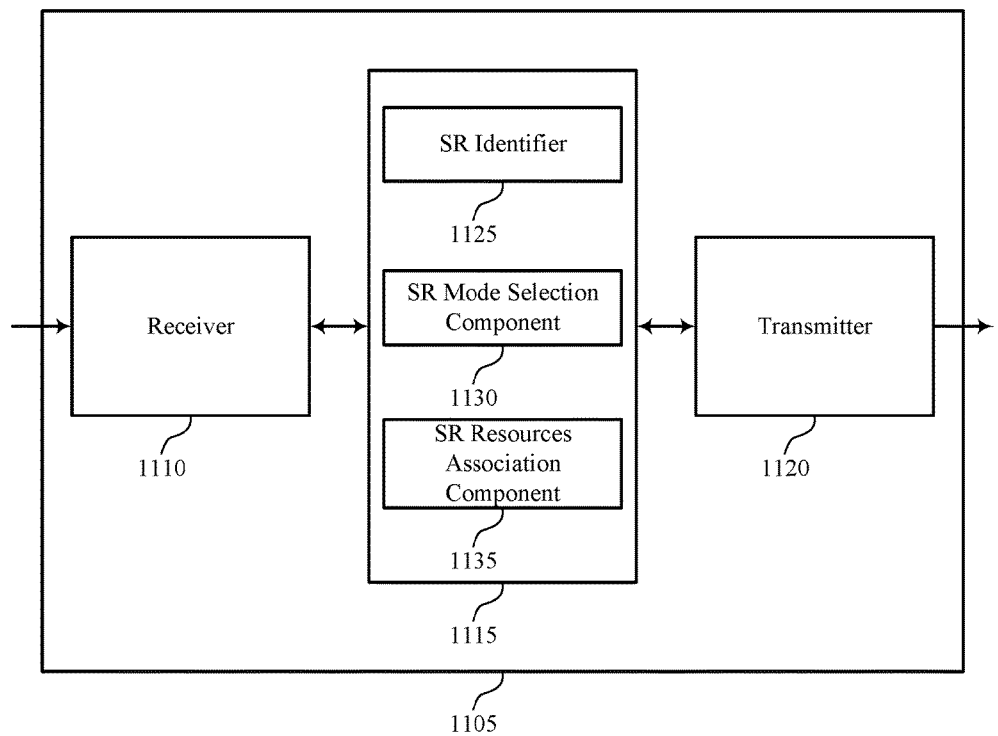

FIG. 11 shows a block diagram 1100 of a wireless device 1105 that supports SR transmission for directional beam access in accordance with various aspects of the present disclosure. Wireless device 1105 may be an example of aspects of a wireless device 1005 or a base station 105 as described with reference to FIGS. 1 and 10. Wireless device 1105 may include receiver 1110, base station SR manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to scheduling request transmission for directional beam access, etc.). Information may be passed on to other components of the device. The receiver 1110 may be an example of aspects of the transceiver 1335 described with reference to FIG. 13.

Base station SR manager 1115 may be an example of aspects of the base station SR manager 1315 described with reference to FIG. 13.

Base station SR manager 1115 may also include SR identifier 1125, SR mode selection component 1130, and SR resources association component 1135.

SR identifier 1125 may configure a UE 115 to identify a characteristic associated with a UE-generated uplink message (e.g., an SR or a BFRR), configure the UE 115 to identify a second UE-generated uplink message for transmission, and configure a UE 115 to identify a UE-generated uplink message for transmission.

SR mode selection component 1130 may configure the UE 115 to determine to transmit an SR using a scheduled mode or an autonomous mode based on the identified characteristic. In some cases, SR mode selection component 1130 may configure the UE 115 to transmit the SR using the scheduled mode if the number of bits fails to satisfy a predetermined threshold. In some cases, SR mode selection component 1130 may configure the UE 115 to transmit the SR using the autonomous mode if the number of bits satisfies a predetermined threshold.

In some cases, SR mode selection component 1130 may configure the UE 115 to transmit the SR using the scheduled mode if the SR is a first transmission of the SR or if the SR is a retransmission of the SR, where a number of retransmission attempts of the retransmission of the SR fails to satisfy a threshold. In some cases, SR mode selection component 1130 may configure the UE 115 to transmit the SR using the autonomous mode if the SR is a retransmission of the SR, where a number of retransmission attempts of the retransmission of the SR satisfies a threshold.

In some cases, SR mode selection component 1130 may configure the UE 115 to transmit the SR using the autonomous mode if the autonomous mode permits transmission of the SR earlier than if the scheduled mode was used. In some cases, SR mode selection component 1130 may configure the UE 115 to transmit the SR using the scheduled mode if the scheduled mode permits transmission of the SR earlier than if the autonomous mode was used. In some cases, SR mode selection component 1130 may configure the UE 115 to switch from the scheduled mode to the autonomous mode or from the autonomous mode to the scheduled mode.

SR resources association component 1135 may indicate an association between the dedicated resources and the downlink directional beam, or associate the SR with the uplink transmission, or configure the UE 115 to identify a dedicated resource for SR transmissions that is associated with the received beamformed synchronization signal. In some cases, the uplink transmission includes a HARQ acknowledgment, a CSF report, a beam measurement report, a SRS, an uplink measurement reference signal, or a combination thereof. In some cases, the uplink transmission includes a SRS, and where receiving the SR on the SRS using the scheduled mode includes receiving an a sequence associated with the SRS, a cyclic shift associated with the SRS, or both, that is indicative of the SR.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
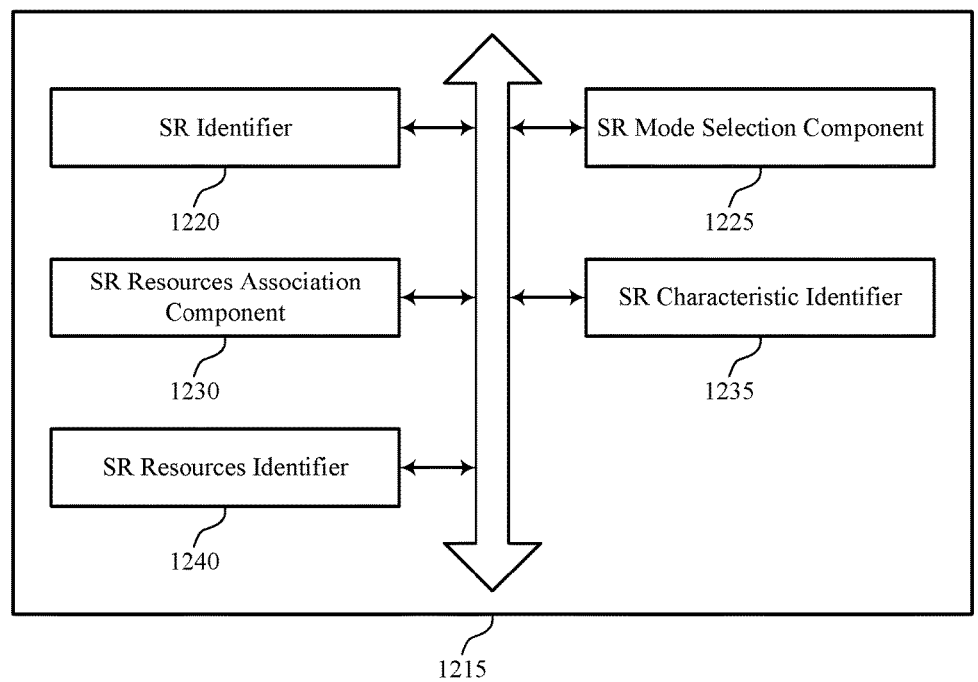

FIG. 12 shows a block diagram 1200 of a base station SR manager 1215 that supports SR transmission for directional beam access in accordance with various aspects of the present disclosure. The base station SR manager 1215 may be an example of aspects of a base station SR manager 1315 described with reference to FIGS. 10, 11, and 13. The base station SR manager 1215 may include SR identifier 1220, SR mode selection component 1225, SR resources association component 1230, SR characteristic identifier 1235, and SR resources identifier 1240. Each of these modules may communicate, directly or indirectly, with one another (e.g., via one or more buses).

SR identifier 1220 may configure a UE 115 to identify a characteristic associated with a UE-generated uplink message (e.g., an SR or a BFRR), configure the UE 115 to identify a second UE-generated uplink message for transmission, and configure a UE 115 to identify a UE-generated uplink message for transmission.

SR mode selection component 1225 may configure the UE 115 to determine to transmit an SR using a scheduled mode or an autonomous mode based on the identified characteristic. In some cases, SR mode selection component 1225 may configure the UE 115 to transmit the SR using the scheduled mode if the number of bits fails to satisfy a predetermined threshold. In some cases, SR mode selection component 1225 may configure the UE 115 to transmit the SR using the autonomous mode if the number of bits satisfies a predetermined threshold.

In some cases, SR mode selection component 1225 may configure the UE 115 to transmit the SR using the scheduled mode if the SR is a first transmission of the SR or if the SR is a retransmission of the SR, where a number of retransmission attempts of the retransmission of the SR fails to satisfy a threshold. In some cases, SR mode selection component 1225 may configure the UE 115 to transmit the SR using the autonomous mode if the SR is a retransmission of the SR, where a number of retransmission attempts of the retransmission of the SR satisfies a threshold.

In some cases, SR mode selection component 1225 may configure the UE 115 to transmit the SR using the autonomous mode if the autonomous mode permits transmission of the SR earlier than if the scheduled mode was used. In some cases, SR mode selection component 1225 may configure the UE 115 to transmit the SR using the scheduled mode if the scheduled mode permits transmission of the SR earlier than if the autonomous mode was used. In some cases, SR mode selection component 1225 may configure the UE 115 to switch from the scheduled mode to the autonomous mode or from the autonomous mode to the scheduled mode.

SR resources association component 1230 may indicate an association between the dedicated resources and the downlink directional beam, or associate the SR with the uplink transmission, or configure the UE 115 to identify a dedicated resource for SR transmissions that is associated with the received beamformed synchronization signal. In some cases, the uplink transmission includes a HARQ acknowledgment, a CSF report, a beam measurement report, a SRS, an uplink measurement reference signal, or a combination thereof. In some cases, the uplink transmission includes a SRS, and where receiving the SR on the SRS using the scheduled mode includes receiving a sequence associated with the SRS, a cyclic shift associated with the SRS, or both, that is indicative of the SR.

SR characteristic identifier 1235 may identify a characteristic associated with the SR. In some cases, the identified characteristic includes a number of bits associated with the SR. In some cases, the identified characteristic includes an indication of whether the SR is a retransmission of the SR. In some cases, the identified characteristic includes a priority level associated with the SR.

SR resources identifier 1240 may reserve dedicated resources for SR transmissions. In some cases, the dedicated resources are different from resources reserved for RACH transmissions. In some cases, the dedicated resources are resources reserved for RACH transmissions, and where receiving the SR includes receiving a RACH sequence to indicate the SR.

Figure 13:
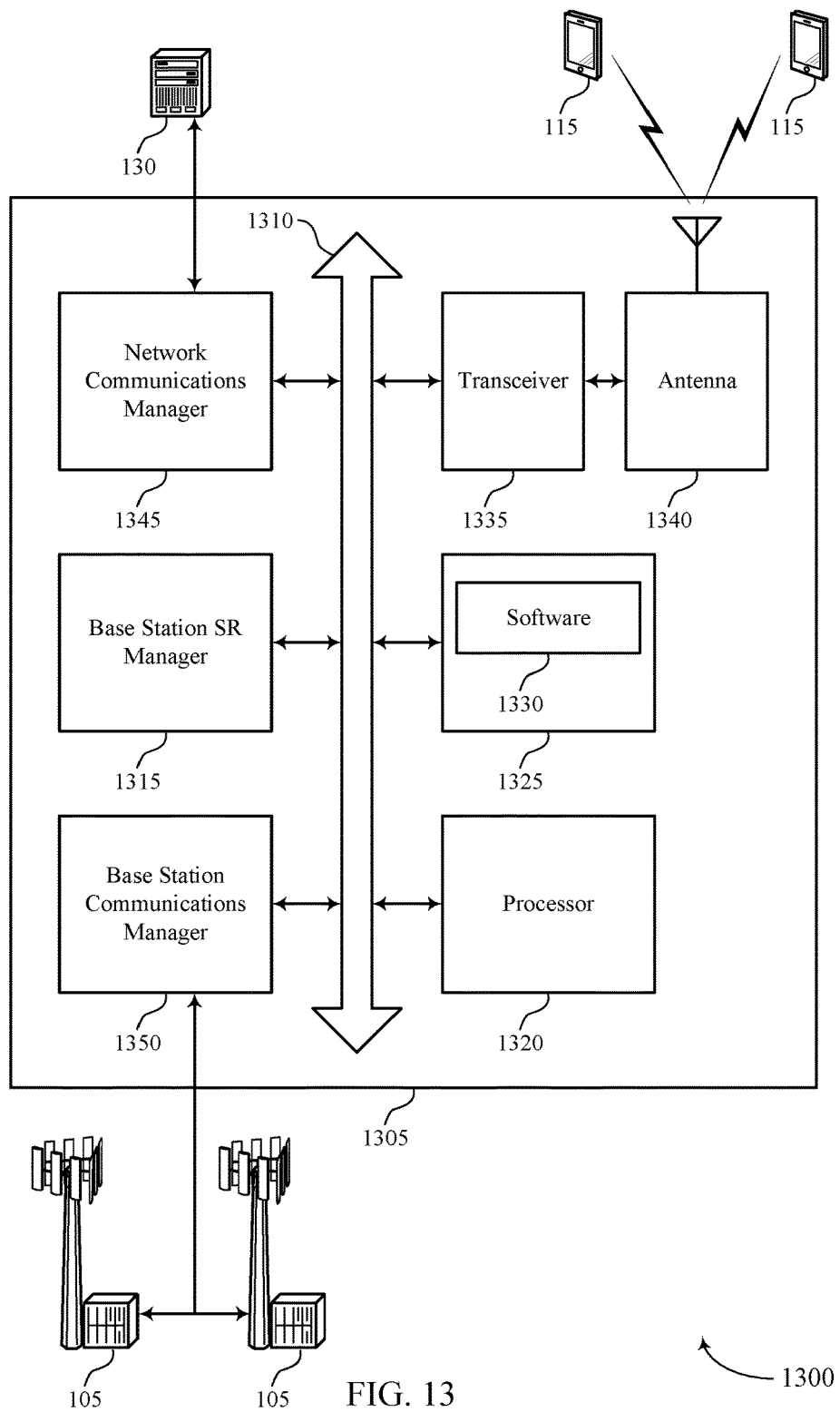
FIG. 13 illustrates a block diagram of a system including a base station that supports SR transmission for directional beam access in accordance with aspects of the present disclosure.

FIG. 13 shows a diagram of a system 1300 including a device 1305 that supports SR transmission for directional beam access in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station SR manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting scheduling request transmission for directional beam access).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support SR transmission for directional beam access. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide a X2 interface within a LTE/LTE-A wireless communication network technology to provide communication between base stations 105.

Figure 14:
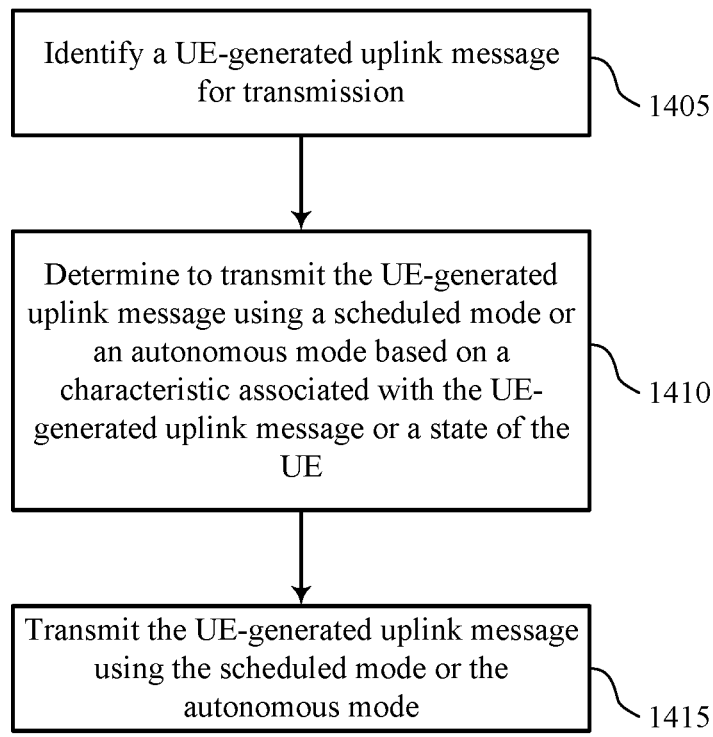
FIGS. 14 through 19 illustrate methods for SR transmission for directional beam access in accordance with aspects of the present disclosure.

FIG. 14 shows a flowchart illustrating a method 1400 for SR transmission for directional beam access in accordance with various aspects of the present disclosure. The operations of method 1400 may be implemented by a UE 115 or its components as described herein. For example, the operations of method 1400 may be performed by a UE SR manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may identify a UE-generated uplink message (e.g., an SR or a BFRR) for transmission. The operations of block 1405 may be performed according to the methods described with reference to FIGS. 1 through 5. In certain examples, aspects of the operations of block 1405 may be performed by a SR identifier as described with reference to FIGS. 6 through 9.

At block 1410 the UE 115 may determine to transmit the UE-generated uplink message using a scheduled mode or an autonomous mode based at least in part on a characteristic associated with the UE-generated uplink message or a state of the UE. The operations of block 1410 may be performed according to the methods described with reference to FIGS. 1 through 5. In certain examples, aspects of the operations of block 1410 may be performed by a SR mode selection component as described with reference to FIGS. 6 through 9.

At block 1415 the UE 115 may transmit the UE-generated uplink message using the scheduled mode or the autonomous mode. The operations of block 1415 may be performed according to the methods described with reference to FIGS. 1 through 5. In certain examples, aspects of the operations of block 1415 may be performed by a transmitter as described with reference to FIGS. 6 through 9.

Figure 15:
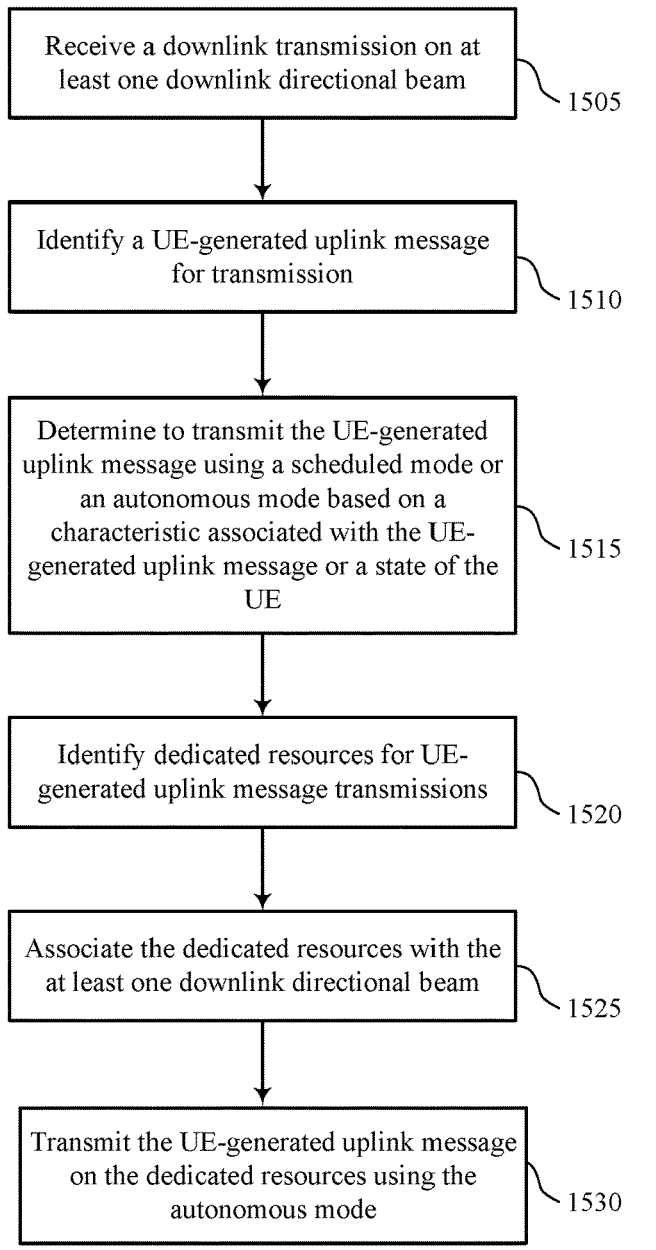

FIG. 15 shows a flowchart illustrating a method 1500 for SR transmission for directional beam access in accordance with various aspects of the present disclosure. The operations of method 1500 may be implemented by a UE 115 or its components as described herein. For example, the operations of method 1500 may be performed by a UE SR manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may receive a downlink transmission on a downlink directional beam. The operations of block 1505 may be performed according to the methods described with reference to FIGS. 1 through 5. In certain examples, aspects of the operations of block 1505 may be performed by a receiver as described with reference to FIGS. 6 through 9.

At block 1510 the UE 115 may identify a UE-generated uplink message (e.g., an SR or a BFRR) for transmission. The operations of block 1510 may be performed according to the methods described with reference to FIGS. 1 through 5. In certain examples, aspects of the operations of block 1510 may be performed by a SR identifier as described with reference to FIGS. 6 through 9.

At block 1515 the UE 115 may determine to transmit the UE-generated uplink message using a scheduled mode or an autonomous mode based at least in part on a characteristic associated with the UE-generated uplink message or a state of the UE. The operations of block 1515 may be performed according to the methods described with reference to FIGS. 1 through 5. In certain examples, aspects of the operations of block 1515 may be performed by a SR mode selection component as described with reference to FIGS. 6 through 9.

At block 1520 the UE 115 may identify dedicated resources for UE-generated uplink message transmissions. The operations of block 1520 may be performed according to the methods described with reference to FIGS. 1 through 5. In certain examples, aspects of the operations of block 1520 may be performed by a SR resources identifier as described with reference to FIGS. 6 through 9.

At block 1525 the UE 115 may associate the dedicated resources with the downlink directional beam. The operations of block 1525 may be performed according to the methods described with reference to FIGS. 1 through 5. In certain examples, aspects of the operations of block 1525 may be performed by a SR resources association component as described with reference to FIGS. 6 through 9.

At block 1530 the UE 115 may transmit the UE-generated uplink message on the dedicated resources using the autonomous mode. The operations of block 1530 may be performed according to the methods described with reference to FIGS. 1 through 5. In certain examples, aspects of the operations of block 1530 may be performed by a transmitter as described with reference to FIGS. 6 through 9.

Figure 16:
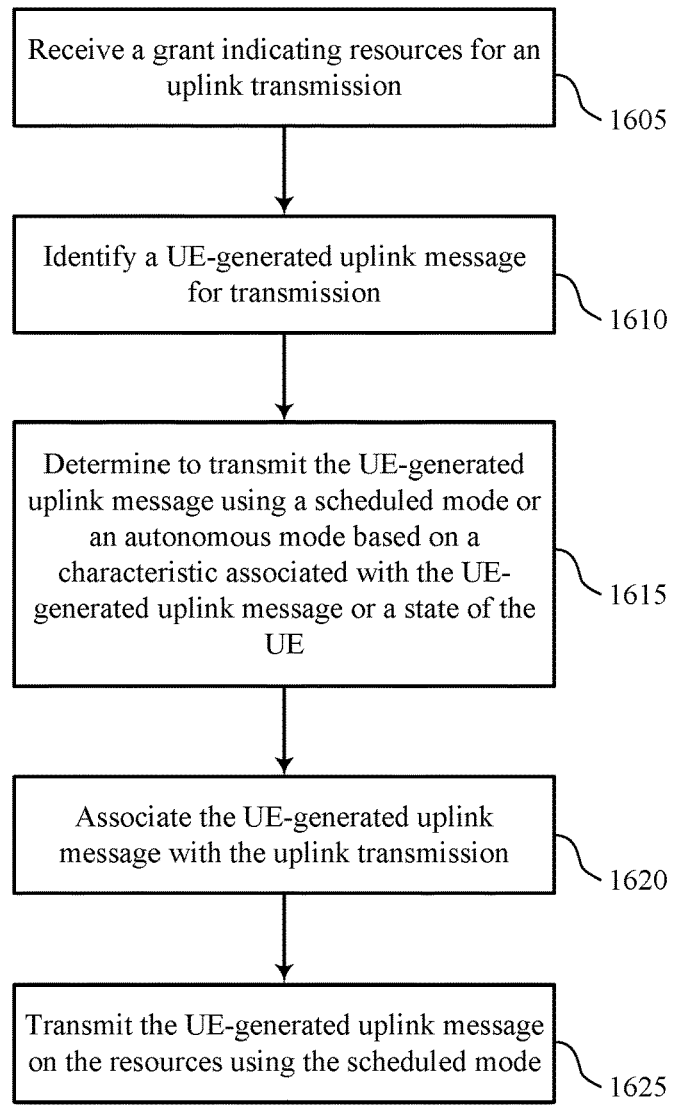

FIG. 16 shows a flowchart illustrating a method 1600 for SR transmission for directional beam access in accordance with various aspects of the present disclosure. The operations of method 1600 may be implemented by a UE 115 or its components as described herein. For example, the operations of method 1600 may be performed by a UE SR manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may receive a grant indicating resources for an uplink transmission. The operations of block 1605 may be performed according to the methods described with reference to FIGS. 1 through 5. In certain examples, aspects of the operations of block 1605 may be performed by a receiver as described with reference to FIGS. 6 through 9.

At block 1610 the UE 115 may identify a UE-generated uplink message (e.g., an SR or a BFRR) for transmission. The operations of block 1610 may be performed according to the methods described with reference to FIGS. 1 through 5. In certain examples, aspects of the operations of block 1610 may be performed by a SR identifier as described with reference to FIGS. 6 through 9.

At block 1615 the UE 115 may determine to transmit the UE-generated uplink message using a scheduled mode or an autonomous mode based at least in part on a characteristic associated with the UE-generated uplink message or a state of the UE. The operations of block 1615 may be performed according to the methods described with reference to FIGS. 1 through 5. In certain examples, aspects of the operations of block 1615 may be performed by a SR mode selection component as described with reference to FIGS. 6 through 9.

At block 1620 the UE 115 may associate the UE-generated uplink message with the uplink transmission. The operations of block 1620 may be performed according to the methods described with reference to FIGS. 1 through 5. In certain examples, aspects of the operations of block 1620 may be performed by a SR resources association component as described with reference to FIGS. 6 through 9.

At block 1625 the UE 115 may transmit the UE-generated uplink message on the resources using the scheduled mode. The operations of block 1625 may be performed according to the methods described with reference to FIGS. 1 through 5. In certain examples, aspects of the operations of block 1625 may be performed by a transmitter as described with reference to FIGS. 6 through 9.

Figure 17:
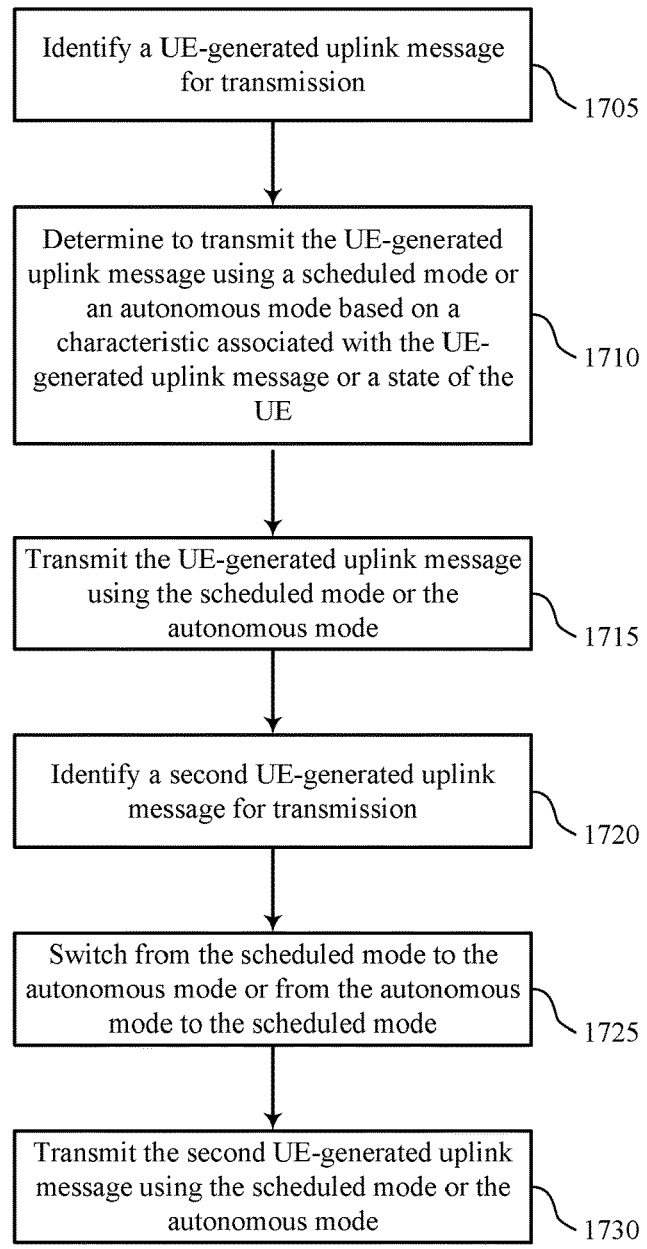

FIG. 17 shows a flowchart illustrating a method 1700 for SR transmission for directional beam access in accordance with various aspects of the present disclosure. The operations of method 1700 may be implemented by a UE 115 or its components as described herein. For example, the operations of method 1700 may be performed by a UE SR manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may identify a UE-generated uplink message (e.g., an SR or a BFRR) for transmission. The operations of block 1705 may be performed according to the methods described with reference to FIGS. 1 through 5. In certain examples, aspects of the operations of block 1705 may be performed by a SR identifier as described with reference to FIGS. 6 through 9.

At block 1710 the UE 115 may determine to transmit the UE-generated uplink message using a scheduled mode or an autonomous mode based at least in part on a characteristic associated with the UE-generated uplink message or a state of the UE. The operations of block 1710 may be performed according to the methods described with reference to FIGS. 1 through 5. In certain examples, aspects of the operations of block 1710 may be performed by a SR mode selection component as described with reference to FIGS. 6 through 9.

At block 1715 the UE 115 may transmit the UE-generated uplink message using the scheduled mode or the autonomous mode. The operations of block 1715 may be performed according to the methods described with reference to FIGS. 1 through 5. In certain examples, aspects of the operations of block 1715 may be performed by a transmitter as described with reference to FIGS. 6 through 9.

At block 1720 the UE 115 may identify a second UE-generated uplink message for transmission. The operations of block 1720 may be performed according to the methods described with reference to FIGS. 1 through 5. In certain examples, aspects of the operations of block 1720 may be performed by a SR identifier as described with reference to FIGS. 6 through 9.

At block 1725 the UE 115 may switch from the scheduled mode to the autonomous mode or from the autonomous mode to the scheduled mode. The operations of block 1725 may be performed according to the methods described with reference to FIGS. 1 through 5. In certain examples, aspects of the operations of block 1725 may be performed by a SR mode selection component as described with reference to FIGS. 6 through 9.

At block 1730 the UE 115 may transmit the second UE-generated uplink message using the scheduled mode or the autonomous mode. The operations of block 1730 may be performed according to the methods described with reference to FIGS. 1 through 5. In certain examples, aspects of the operations of block 1730 may be performed by a transmitter as described with reference to FIGS. 6 through 9.

Figure 18:
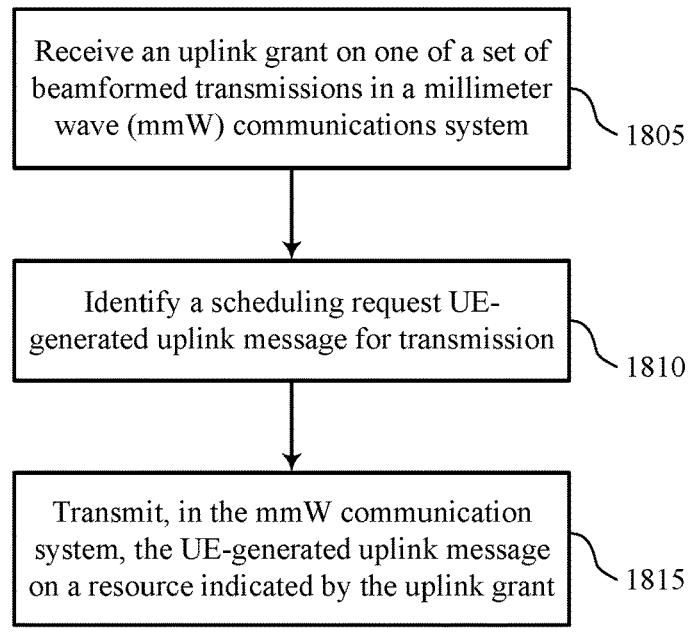

FIG. 18 shows a flowchart illustrating a method 1800 for SR transmission for directional beam access in accordance with various aspects of the present disclosure. The operations of method 1800 may be implemented by a UE 115 or its components as described herein. For example, the operations of method 1800 may be performed by a UE SR manager as described with reference to FIGS. 6 through 9.

In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive an uplink grant on one of a plurality of beamformed transmissions in a mmW communications system. The operations of block 1805 may be performed according to the methods described with reference to FIGS. 1 through 5. In certain examples, aspects of the operations of block 1805 may be performed by a receiver as described with reference to FIGS. 6 through 9. The beamformed transmission may also occur in a sub-6 GHz spectrum.

At block 1810 the UE 115 may identify a UE-generated uplink message (e.g., an SR or a BFRR) for transmission. The operations of block 1810 may be performed according to the methods described with reference to FIGS. 1 through 5. In certain examples, aspects of the operations of block 1810 may be performed by a SR identifier as described with reference to FIGS. 6 through 9.

At block 1815 the UE 115 may transmit, in the mmW communication system, the UE-generated uplink message on a resource indicated by the uplink grant. The operations of block 1815 may be performed according to the methods described with reference to FIGS. 1 through 5. In certain examples, aspects of the operations of block 1815 may be performed by a transmitter as described with reference to FIGS. 6 through 9.

Figure 19:
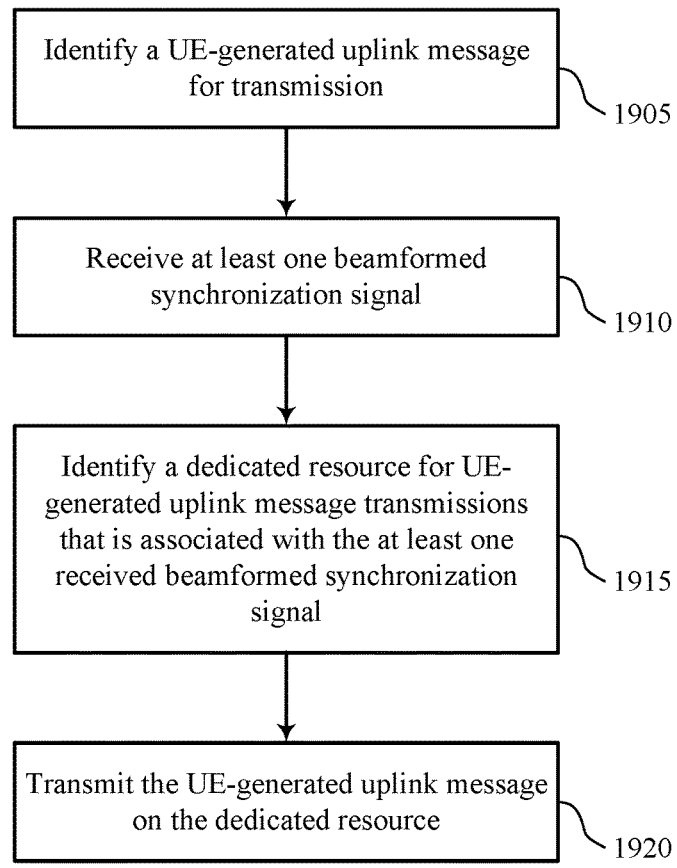

FIG. 19 shows a flowchart illustrating a method 1900 for SR transmission for directional beam access in accordance with various aspects of the present disclosure. The operations of method 1900 may be implemented by a UE 115 or its components as described herein. For example, the operations of method 1900 may be performed by a UE SR manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may identify a UE-generated uplink message (e.g., an SR or a BFRR) for transmission. The operations of block 1905 may be performed according to the methods described with reference to FIGS. 1 through 5. In certain examples, aspects of the operations of block 1905 may be performed by a SR identifier as described with reference to FIGS. 6 through 9.

At block 1910 the UE 115 may receive a beamformed synchronization signal. The operations of block 1910 may be performed according to the methods described with reference to FIGS. 1 through 5. In certain examples, aspects of the operations of block 1910 may be performed by a receiver as described with reference to FIGS. 6 through 9.

At block 1915 the UE 115 may identify a dedicated resource for UE-generated uplink message transmissions that is associated with the received beamformed synchronization signal. The operations of block 1915 may be performed according to the methods described with reference to FIGS. 1 through 5. In certain examples, aspects of the operations of block 1915 may be performed by a SR resources identifier as described with reference to FIGS. 6 through 9.

At block 1920 the UE 115 may transmit the UE-generated uplink message on the dedicated resource. The operations of block 1920 may be performed according to the methods described with reference to FIGS. 1 through 5. In certain examples, aspects of the operations of block 1920 may be performed by a transmitter as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a UE-generated uplink message for transmission;
    selecting a scheduled mode or an autonomous mode for transmitting the UE-generated uplink message based at least in part on a characteristic associated with the UE-generated uplink message or a state of the UE, wherein the characteristic associated with the UE-generated uplink message comprises an indication of whether the UE-generated uplink message is a retransmission of the UE-generated uplink message; and
    transmitting the UE-generated uplink message using the scheduled mode or the autonomous mode.
2. The method of claim 1, wherein the UE-generated uplink message comprises a scheduling request (SR) or a beam failure recovery request (BFRR).
3. The method of claim 1, further comprising:
    transmitting the UE-generated uplink message using the scheduled mode if the UE-generated uplink message is a first transmission of the UE-generated uplink message or if the UE-generated uplink message is a retransmission of the UE-generated uplink message, wherein a number of retransmission attempts of the retransmission of the UE-generated uplink message fails to satisfy a predetermined threshold.
4. The method of claim 1, further comprising:
    transmitting the UE-generated uplink message using the autonomous mode if the UE-generated uplink message is a retransmission of the UE-generated uplink message, wherein a number of retransmission attempts of the retransmission of the UE-generated uplink message satisfies a predetermined threshold.
5. The method of claim 1, further comprising:
    transmitting the UE-generated uplink message using the autonomous mode if the autonomous mode permits transmission of the UE-generated uplink message earlier than if the scheduled mode was used.
6. The method of claim 1, further comprising:
    transmitting the UE-generated uplink message using the scheduled mode if the scheduled mode permits transmission of the UE-generated uplink message earlier than if the autonomous mode was used.
7. The method of claim 1, further comprising:
    receiving a downlink transmission on at least one downlink directional beam;
    identifying dedicated resources for UE-generated uplink message transmissions;
    associating the dedicated resources with the at least one downlink directional beam; and
    transmitting the UE-generated uplink message on the dedicated resources using the autonomous mode.
8. The method of claim 7, wherein the dedicated resources are different from resources reserved for random access channel (RACH) transmissions.
9. The method of claim 8, wherein the UE-generated uplink message transmissions and RACH transmissions are multiplexed in frequency domain, time domain, code domain, or a combination thereof.
10. The method of claim 7, wherein the dedicated resources are resources reserved for random access channel (RACH) transmissions, and wherein transmitting the UE-generated uplink message comprises:
    transmitting a RACH sequence to indicate the UE-generated uplink message.
11. The method of claim 7, wherein the downlink transmission comprises a synchronization signal, a master information block (MIB), or a system information block (SIB).
12. The method of claim 1, further comprising:
    receiving a grant indicating resources for an uplink transmission;
    associating the UE-generated uplink message with the uplink transmission; and
    transmitting the UE-generated uplink message on the resources using the scheduled mode.
13. The method of claim 12, wherein the uplink transmission comprises a hybrid automatic repeat request (HARM) acknowledgment, a channel state feedback (CSF) report, a beam measurement report, a sounding reference signal (SRS), an uplink measurement reference signal, a physical uplink control channel (PUCCH), or a combination thereof.
14. The method of claim 12, wherein the uplink transmission comprises a sounding reference signal (SRS), and wherein transmitting the UE-generated uplink message on the resources using the scheduled mode comprises:
    indicating a sequence associated with the SRS, a cyclic shift associated with the SRS, or both, that is indicative of the UE-generated uplink message.
15. The method of claim 1, further comprising:
    identifying a second UE-generated uplink message for transmission;
    switching from the scheduled mode to the autonomous mode or from the autonomous mode to the scheduled mode; and
    transmitting the second UE-generated uplink message using the scheduled mode or the autonomous mode.
16. An apparatus for wireless communication at a user equipment (UE), comprising:
    a processor;
    memory in electronic communication with the processor; and
    instructions stored in the memory and operable, when executed by the processor, to cause the apparatus to:
    identify a UE-generated uplink message for transmission;
    select a scheduled mode or an autonomous mode for transmitting the UE-generated uplink message based at least in part on a characteristic associated with the UE-generated uplink message or a state of the UE, wherein the characteristic associated with the UE-generated uplink message comprises an indication of whether the UE-generated uplink message is a retransmission of the UE-generated uplink message; and transmit the UE-generated uplink message using the scheduled mode or the autonomous mode.

17. The apparatus of claim 16, wherein the UE-generated uplink message comprises a scheduling request (SR) or a beam failure recovery request (BFRR).

18. The apparatus of claim 16, wherein the instructions are further executable by the processor to:
    transmit the UE-generated uplink message using the scheduled mode if the UE-generated uplink message is a first transmission of the UE-generated uplink message or if the UE-generated uplink message is a retransmission of the UE-generated uplink message, wherein a number of retransmission attempts of the retransmission of the UE-generated uplink message fails to satisfy a predetermined threshold; and
    transmit the UE-generated uplink message using the autonomous mode if the UE-generated uplink message is a retransmission of the UE-generated uplink message, wherein the number of retransmission attempts of the retransmission of the UE-generated uplink message satisfies the predetermined threshold.

19. The apparatus of claim 16, wherein the instructions are further executable by the processor to:
    transmit the UE-generated uplink message using the autonomous mode if the autonomous mode permits transmission of the UE-generated uplink message earlier than if the scheduled mode was used; and
    transmit the UE-generated uplink message using the scheduled mode if the scheduled mode permits transmission of the UE-generated uplink message earlier than if the autonomous mode was used.

20. The apparatus of claim 16, wherein the instructions are further executable by the processor to:
    receive a downlink transmission on at least one downlink directional beam;
    identify dedicated resources for UE-generated uplink message transmissions;
    associate the dedicated resources with the at least one downlink directional beam; and
    transmit the UE-generated uplink message on the dedicated resources using the autonomous mode.

21. The apparatus of claim 16, wherein the instructions are further executable by the processor to:
    receive a grant indicating resources for an uplink transmission;
    associate the UE-generated uplink message with the uplink transmission; and
    transmit the UE-generated uplink message on the resources using the scheduled mode.

22. The apparatus of claim 16, wherein the instructions are further executable by the processor to:
    identify a second UE-generated uplink message for transmission;
    switch from the scheduled mode to the autonomous mode or from the autonomous mode to the scheduled mode; and
    transmit the second UE-generated uplink message using the scheduled mode or the autonomous mode.

23. An apparatus for wireless communication at a user equipment (UE), comprising:
    means for identifying a UE-generated uplink message for transmission;
    means for selecting a scheduled mode or an autonomous mode for transmitting the UE-generated uplink message based at least in part on a characteristic associated with the UE-generated uplink message or a state of the UE, wherein the characteristic associated with the UE-generated uplink message comprises an indication of whether the UE-generated uplink message is a retransmission of the UE-generated uplink message; and
    means for transmitting the UE-generated uplink message using the scheduled mode or the autonomous mode.

24. The apparatus of claim 23, wherein the UE-generated uplink message comprises a scheduling request (SR) or a beam failure recovery request (BFRR).

25. The apparatus of claim 23, further comprising:
    means for transmitting the UE-generated uplink message using the scheduled mode if the UE-generated uplink message is a first transmission of the UE-generated uplink message or if the UE-generated uplink message is a retransmission of the UE-generated uplink message, wherein a number of retransmission attempts of the retransmission of the UE-generated uplink message fails to satisfy a predetermined threshold; and
    means for transmitting the UE-generated uplink message using the autonomous mode if the UE-generated uplink message is a retransmission of the UE-generated uplink message, wherein the number of retransmission attempts of the retransmission of the UE-generated uplink message satisfies the predetermined threshold.

26. The apparatus of claim 23, further comprising:
    means for transmitting the UE-generated uplink message using the autonomous mode if the autonomous mode permits transmission of the UE-generated uplink message earlier than if the scheduled mode was used; and
    means for transmitting the UE-generated uplink message using the scheduled mode if the scheduled mode permits transmission of the UE-generated uplink message earlier than if the autonomous mode was used.

27. A non-transitory computer-readable medium storing code for wireless communication at a user equipment (UE), the code comprising instructions executable by a processor to:
    identify a UE-generated uplink message for transmission;
    select a scheduled mode or an autonomous mode for transmitting the UE-generated uplink message based at least in part on a characteristic associated with the UE-generated uplink message or a state of the UE, wherein the characteristic associated with the UE-generated uplink message comprises an indication of whether the UE-generated uplink message is a retransmission of the UE-generated uplink message; and
    transmit the UE-generated uplink message using the scheduled mode or the autonomous mode.

28. The non-transitory computer-readable medium of claim 27, wherein the UE-generated uplink message comprises a scheduling request (SR) or a beam failure recovery request (BFRR).

29. The non-transitory computer-readable medium of claim 27, wherein the instructions are further executable to:
    transmit the UE-generated uplink message using the scheduled mode if the UE-generated uplink message is a first transmission of the UE-generated uplink message or if the UE-generated uplink message is a retransmission of the UE-generated uplink message, wherein a number of retransmission attempts of the retransmission of the UE-generated uplink message fails to satisfy a predetermined threshold; and transmit the UE-generated uplink message using the autonomous mode if the UE-generated uplink message is a retransmission of the UE-generated uplink message, wherein the number of retransmission attempts of the retransmission of the UE-generated uplink message satisfies the predetermined threshold.

30. The non-transitory computer-readable medium of claim 27, wherein the instructions are further executable to:
transmit the UE-generated uplink message using the autonomous mode if the autonomous mode permits transmission of the UE-generated uplink message earlier than if the scheduled mode was used; and
transmit the UE-generated uplink message using the scheduled mode if the scheduled mode permits transmission of the UE-generated uplink message earlier than if the autonomous mode was used.

* * * * *